United States Patent
Lee

(10) Patent No.: US 10,142,581 B2
(45) Date of Patent: Nov. 27, 2018

(54) DISPLAY DEVICE AND CONTROL METHOD THEREOF

(71) Applicant: LG ELECTRONICS INC., Seoul (KR)

(72) Inventor: Jaejun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/567,425

(22) PCT Filed: May 8, 2015

(86) PCT No.: PCT/KR2015/004644
§ 371 (c)(1),
(2) Date: Oct. 18, 2017

(87) PCT Pub. No.: WO2016/175361
PCT Pub. Date: Nov. 3, 2016

(65) Prior Publication Data
US 2018/0091758 A1    Mar. 29, 2018

(30) Foreign Application Priority Data
Apr. 27, 2015    (KR) .......... 10-2015-0058880

(51) Int. Cl.
| H04N 5/445 | (2011.01) |
| H04N 9/74 | (2006.01) |
| G06F 3/14 | (2006.01) |
| G06F 3/01 | (2006.01) |
| G06F 3/03 | (2006.01) |
| G06F 3/048 | (2013.01) |
| G06F 13/38 | (2006.01) |

(Continued)

(52) U.S. Cl.
CPC .......... *H04N 5/44582* (2013.01); *G06F 3/01* (2013.01); *G06F 3/03* (2013.01); *G06F 3/048* (2013.01); *G06F 3/14* (2013.01); *G06F 13/385* (2013.01); *G06F 13/4022* (2013.01); *G06F 13/4282* (2013.01); *H04N 5/44591* (2013.01)

(58) Field of Classification Search
CPC .......... H04N 5/44582; H04N 5/44591; H04N 5/44543; H04N 5/45; H04N 21/4316; H04N 5/445; H04N 9/74; H04N 9/764
USPC ....... 348/725, 563–565, 584, 588, 598, 569; 725/59, 40
See application file for complete search history.

(56) References Cited

U.S. PATENT DOCUMENTS

2005/0275641 A1    12/2005    Franz
2008/0320524 A1*   12/2008    Sakamoto .......... H04N 5/44543
                                                    725/52

(Continued)

FOREIGN PATENT DOCUMENTS

WO    WO 2014/027173 A1    2/2014

*Primary Examiner* — Sherrie Hsia
(74) *Attorney, Agent, or Firm* — Birch, Stewart, Kolasch & Birch, LLP

(57) ABSTRACT

The present invention relates to a display device in which, when a pointer reaches an area change detection zone in which a screen is divided into a first area and a second area, a first device receives a control command from a second device so that a first device and a second device having different Oss installed therein can be controlled by one input device such as a display device, a keyboard, and a mouse, and data can be transmitted or received between the first device and the second device.

14 Claims, 23 Drawing Sheets

(51) Int. Cl.
*G06F 13/40* (2006.01)
*G06F 13/42* (2006.01)

(56) References Cited

U.S. PATENT DOCUMENTS

2009/0059073 A1  3/2009  Cho et al.
2015/0067550 A1  3/2015  Shin
2015/0077356 A1  3/2015  Choi et al.

* cited by examiner

DISPLAY DEVICE AND CONTROL METHOD THEREOF

CROSS REFERENCE TO RELATED APPLICATIONS

This application is the National Phase of PCT International Application No. PCT/KR2015/004644, filed on May 8, 2015, which claims priority under 35 U.S.C. 119(a) to Patent Application No. 10-2015-0058880, filed in Republic of Korea on Apr. 27, 2015, all of which are hereby expressly incorporated by reference into the present application.

TECHNICAL FIELD

The present invention relates to a display device, and more particularly, to a display device and controlling method thereof. Using a PBP mode in a display device such as a monitor or a smart TV, the present invention is suitable for sharing a user input device such as a keyboard or a mouse among a plurality of devices, controlling a plurality of the devices, and sharing data among a plurality of the devices.

BACKGROUND ART

Recently, many users use display devices such as monitors, smart TVs and the like. According to a related art, devices (e.g., PC) using the same OS usable for a single monitor only. Yet, devices differing in OS are not compatible with each other.

For example, if a first device and a second device use Windows OS and Mac OS for a single monitor, respectively, since the two devices are not compatible with each other, a user has difficulty in sending data and sharing files, thereby causing inconvenience to the user.

DISCLOSURE OF THE INVENTION

Technical Tasks

One technical task of the present invention is to provide a display device and controlling method thereof, by which data can be transceived between a first device and a second device having heterogeneous OSs respectively installed thereon in a manner that a first USB hub receives an input signal from a first device, that a second USB hub receives an input signal from a second device, that a first element connected to the first USB hub recognizes the first device, that a second element connected to the second USB hub recognizes the second device, and that the first device and the second device are communication-connected to each other.

Another technical task of the present invention is to provide a display device and controlling method thereof, by which user convenience is improved because a user can move a specific file from a first region to a second region having an installed OS different from that of the first region using a pointer.

Another technical task of the present invention is to provide a display device and controlling method thereof, by which user convenience is improved because a single keyboard mouse can be shared among devices having different OSs respectively installed thereon using a USB hub switching.

Another technical task of the present invention is to provide a display device and controlling method thereof, by which user convenience is improved because an application related to a specific file can be launched if the specific file is moved from a first region to a second region.

Further technical task of the present invention is to provide a display device and controlling method thereof, by which user convenience is improved because data transmission can be performed through a display device despite that a plurality of devices are not network-connected by wire or wireless.

Technical Solutions

In one technical aspect of the present invention, provided herein is a display device, including a first USB hub receiving an input signal from a first device, a second USB hub receiving an input signal from a second device, a controller communication-connecting the first USB hub and the second USB hub if the first USB hub and the second USB hub recognize the first device and the second device, respectively, the controller receiving a control command for controlling a pointer from a specific device corresponding to one of the first device and the second device, the controller receiving a control command for controlling the pointer from a device different from the specific device if the pointer displayed on a specific region corresponding to one of a first region and a second region reaches a region change sensing region for partitioning a screen into the first region and the second region in a state that the screen is partitioned into the first region and the second region, and a display module displaying at least one of the pointer, a text and a graphic image on the screen in response to the control command from the controller, wherein the first region displays a screen output of the first device and wherein the second region displays a screen output of the second device.

In another technical aspect of the present invention, provided herein is a display device, including a first terminal receiving an input signal from a first device, a second terminal receiving an input signal from a second device, a controller, when the first device and the second device are connected via a network, if the first terminal and the second terminal recognize the first device and the second device, respectively, the controller receiving a control command for controlling a pointer from a specific device corresponding to one of the first device and the second device, the controller receiving a control command for controlling the pointer from a device different from the specific device through the network if the pointer displayed on a specific region corresponding to one of a first region and a second region reaches a region change sensing region for partitioning a screen into the first region and the second region in a state that the screen is partitioned into the first region and the second region, and a display module displaying at least one of the pointer, a text and a graphic image on the screen in response to the control command from the controller, wherein the first region displays a screen output of the first device and wherein the second region displays a screen output of the second device.

In further technical aspect of the present invention, provided herein is a display device, including a first terminal receiving an input signal from a first device, a second terminal receiving an input signal from a second device, a controller, if the first terminal and the second terminal recognize the first device and the second device, respectively, the controller connecting the first terminal and the second terminal by API communication, the controller receiving a control command for controlling a pointer from a specific device corresponding to one of the first device and the second device, the controller receiving a control command for controlling the pointer from a device different from the specific device through the network if the pointer displayed on a specific region corresponding to one of a first region and a second region reaches a region change sensing region for partitioning a screen into the first region and the second region in a state that the screen is partitioned into the first region and the second region, and a display module displaying at least one of the pointer, a text and a graphic image on the screen in response to the control command from the controller, wherein the first region displays a screen output of the first device and wherein the second region displays a screen output of the second device.

Advantageous Effects

According to one embodiment of the present invention, if a pointer reaches a region change detection region for partitioning a screen into a first region and a second region, a control of an input device is switched from a first device to a second device. Hence, data can be transceived between the first and second devices having heterogeneous OSs respectively installed thereon, whereby user convenience is improved.

According to another embodiment of the present invention, user convenience is improved because a user can move a specific file from a first region to a second region having an installed OS different from that of the first region using a pointer.

According to another embodiment of the present invention, user convenience is improved because a single keyboard mouse can be shared among devices having different OSs respectively installed thereon using a USB hub switching.

According to another embodiment of the present invention, user convenience is improved because an application related to a specific file can be launched if the specific file is moved from a first region to a second region.

According to further embodiment of the present invention, user convenience is improved because data transmission can be performed through a display device despite that a plurality of devices are not network-connected by wire or wireless.

BEST MODE FOR INVENTION

Figure 1:
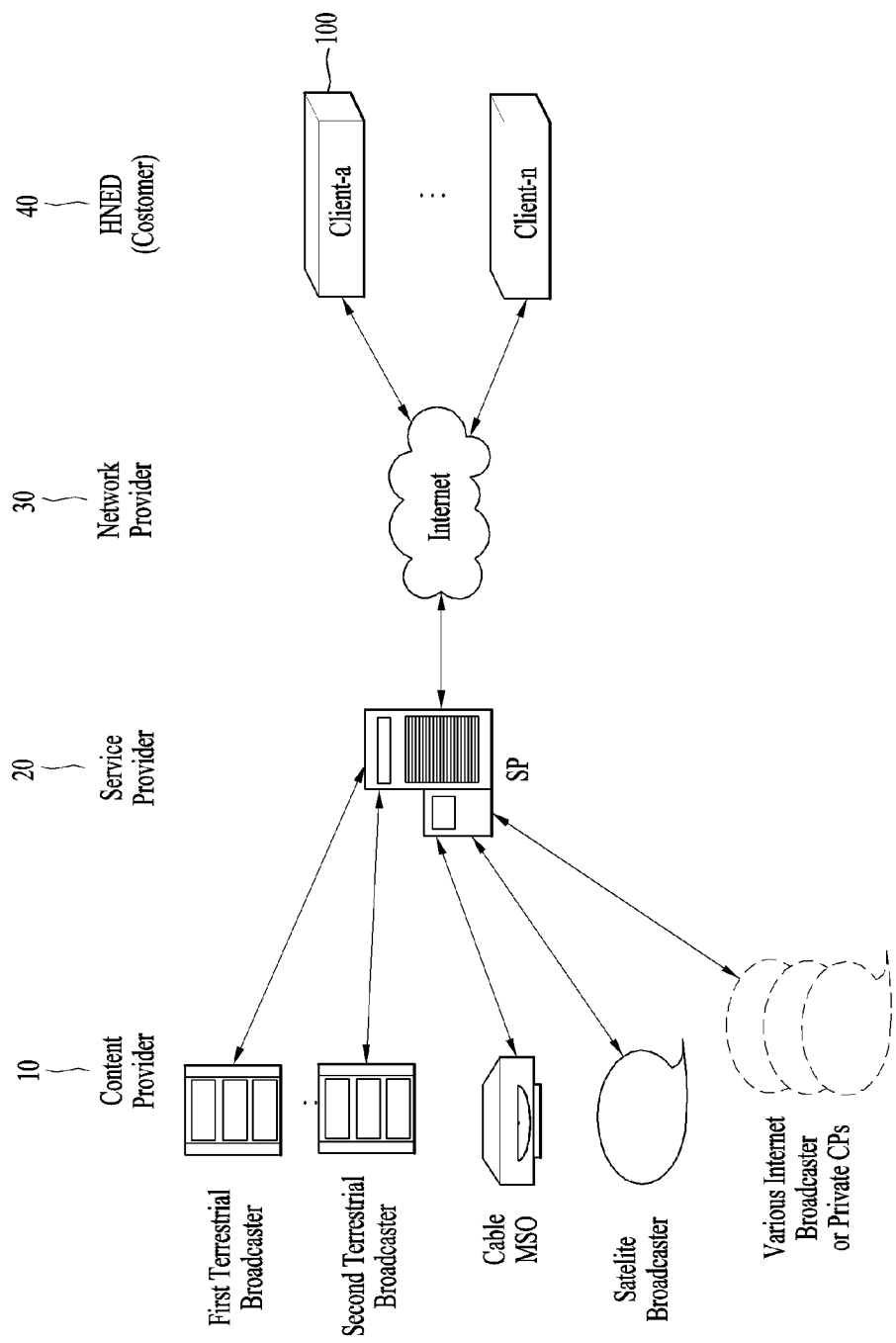
FIG. 1 is a schematic diagram illustrating a service system including a digital device according to one embodiment of the present invention.

Description will now be given in detail according to various embodiment(s) for the present invention disclosed herein, with reference to the accompanying drawings.

Suffixes such as "module", "unit" and the like in this disclosure may be used to refer to elements or components.

Use of such a suffix herein is merely intended to facilitate description of the specification, and both suffixes may be interchangeably usable.

Meanwhile, a video display device described in the present specification is an intelligent video display device having a computer supportive function added to a broadcast reception function for example and may be equipped with such interfaces more convenient for use as a handwriting type input device, a touchscreen, a space remote controller and the like in a manner that an internet function and the like are added by being devoted to the broadcast reception function. As the video display device is connected to Internet and a computer owing to the supported wired or wireless internet function, it is able to perform functions such as email, web browsing, banking, game and the like. For such various functions, a standardized universal OS can be used.

Therefore, with respect to the video display device disclosed in the present invention, since various applications can be freely added to or deleted from a universal OS kernel for example, various kinds of user-friendly functions can be performed. In particular, for example, the video display device may include a network TV, an HBBTV, a smart TV or the like, and is applicable to a smartphone in some cases.

Moreover, although an embodiment of the present invention is described in detail with reference to the accompanying drawings and the contents disclosed in the accompanying drawings, the present invention is not limited or restricted by the embodiments.

Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

'Digital device' described in the present specification includes any device capable of performing at least one of transmission, reception, processing and output of data, content, service, application and the like for example. The digital device can be paired or connected (hereinafter 'paired') with another digital device, an external server and the like through wire/wireless network and transmit/receive prescribed data through the pairing. In doing so, if necessary, the data may be appropriately converted before the transmission/reception. The digital devices may include standing devices (e.g., Network TV, HBBTV (Hybrid Broadcast Broadband TV), Smart TV, IPTV (Internet Protocol TV), PC (Personal Computer), etc.) and mobile devices (e.g., PDA (Personal Digital Assistant), Smart Phone, Tablet PC, Notebook, etc.). In the present specification, to help the understanding of the present invention and the clarity of the applicant's description, a digital TV and a mobile are shown as embodiments of digital devices in FIG. 2 and FIG. 3, respectively. A digital device described in the present specification may include a panel-only configuration, a configuration such as a set-top box (STB), or a single set configuration of device, system and the like.

Meanwhile, 'wire/wireless network' described in the present specification is a common name of a communication network supportive of various communication specifications and/or protocols for the paring or/and data transceiving between digital devices or between a digital device and an external server. Such wire/wireless networks include all communication networks supported currently or all communication networks that will be supported in the future, by the specifications and are capable of supporting one or more communication protocols for the same. Such wire/wireless networks can be established by a network for a wire connection and a communication specification or protocol for the same (e.g., USB (Universal Serial Bus), CVBS (Composite Video Banking Sync), Component, S-video (analog), DVI (Digital Visual Interface), HDMI (High Definition Multimedia Interface), RGB, D-SUB, etc.) and a network for a wireless connection and a communication specification or protocol (e.g., Bluetooth, RFID (Radio Frequency Identification), IrDA (infrared Data Association), UWB (Ultra Wideband), ZigBee, DLNA (Digital Living Network Alliance), WLAN (Wireless LAN)(Wi-Fi), Wibro (Wireless broadband), Wimax (World Interoperability for Microwave Access), HSDPA (High Speed Downlink Packet Access), LTE/LTE-A (Long Term Evolution/LTE-Advanced), Wi-Fi direct).

Besides, if a device is named a digital device in this disclosure, the meaning may indicate a standing device or a mobile device according to a context, or can be used to indicate both unless mentioned specially.

Meanwhile, a digital device is an intelligent device supportive of a broadcast receiving function, a computer function or support, at least one external input and the like, and is able to support e-mail, web browsing, banking, game, application and the like through the aforementioned wire/wireless network. Moreover, the digital device may include an interface (e.g., manual input device, touchscreen, space remote controller, etc.) to support at least one input or control means.

Besides, a digital device may use a standardized OS (operating system). Particularly, a digital device described in the present specification uses webOS for one embodiment. Hence, a digital device can process adding, deleting, amending, updating and the like of various services or applications on Universal OS kernel or Linux kernel, through which a further user-friendly environment can be configured and provided.

Meanwhile, the aforementioned digital device can receive and process an external input. Herein, the external input includes an external input device, i.e., any input means or digital device capable of transmitting/receiving and processing data by being connected to the aforementioned digital device through wire/wireless network. For instance, as the external inputs, a game device (e.g., HDMI (High-Definition Multimedia Interface), Playstation, X-Box, etc.), a printing device (e.g., smart phone, tablet PC, pocket photo, etc.), and a digital device (e.g., smart TV, Blu-ray device, etc.) are included.

Besides, 'server' described in the present specification means a digital device or system that supplies data to the aforementioned digital device (i.e., client) or receives data from it, and may be called a processor. For example, the server may include a portal server providing web page, web content or web service, an advertising server providing advertising data, a content server providing contents, an SNS server providing SNS (Social Network Service), a service server provided by a manufacturer, an MVPD (Multichannel Video Programming Distributor) providing VoD (Video on Demand) or streaming service, a service server providing a pay service and the like.

Moreover, in case that the following description is made using an application only for clarity in the present specification, it may mean a service as well as an application on the basis of a corresponding content and the like. Moreover, an application may mean a web application according to a webOS platform.

In the following description, the present invention is explained in detail with reference to attached drawings.

FIG. 1 is a schematic diagram illustrating a service system including a digital device according to one embodiment of the present invention.

Referring to FIG. 1, a service system may include a content provider (CP) 10, a service provider (SP) 20, a network provider (NP) 30, and a home network end user (HNED) (Customer) 40. The HNED 40 includes a client 100, that is, a digital device according to the present invention.

The CP 10 produces and provides various contents. Referring to FIG. 1, the CP 10 can include a terrestrial broadcaster, a cable system operator (SO), a multiple system operator (MSO), a satellite broadcaster, various Internet broadcasters, private content providers (CPs), etc. Meanwhile, the CP 10 can produce and provide various services, applications and the like as well as well as broadcast contents.

The SP 20 service-packetizes a content produced by the CP 10 and then provides it to the HNED 40. For instance, the SP 20 packetizes at least one of contents, which are produced by a first terrestrial broadcaster, a second terrestrial broadcaster, a cable MSO, a satellite broadcaster, various internet broadcasters, applications and the like, for a service and then provides it to the HNED 40.

The SP 20 can provide services to the client 100 in a uni-cast or multi-cast manner. Meanwhile, the SP 20 can collectively send data to a multitude of pre-registered clients 100. To this end, it is able to use IGMP (internet group management protocol) and the like.

The CP 10 and the SP 20 can be configured in the form of one entity. For example, the CP 10 can function as the SP 20 by producing a content, service-packetizing the produced content, and then providing it to the HNED 40, and vice versa.

The NP 30 provides a network environment for data exchange between the CP 10 and/or the SP 20 and the client 100.

The client 100 is a consumer belonging to the HNED 40. The client 100 may receive data by establishing a home network through the NP 30 for example and transmit/receive data for various services (e.g., VoD, streaming, etc.), applications and the like.

The CP 10 or/and the SP 20 in the service system may use a conditional access or content protection means for the protection of a transmitted content. Hence, the client 100 can use a processing means such as a cable card (CableCARD) (or POD (point of deployment) or a downloadable CAS (DCAS), which corresponds to the conditional access or the content protection.

In addition, the client 100 may use an interactive service through a network as well. In this case, the client 100 can directly serve as a content provider. And, the SP 20 may receive and transmit it to another client or the like.

In FIG. 1, the CP 10 or/and the SP 20 may be a service providing server that will be described later in the present specification. In this case, the server may mean that the NP 30 is owned or included if necessary. In the following description, despite not being specially mentioned, a service or a service data includes an internal service or application as well as a service or application received externally, and such a service or application may mean a service or application data for the WebOS based client 100.

Figure 2:
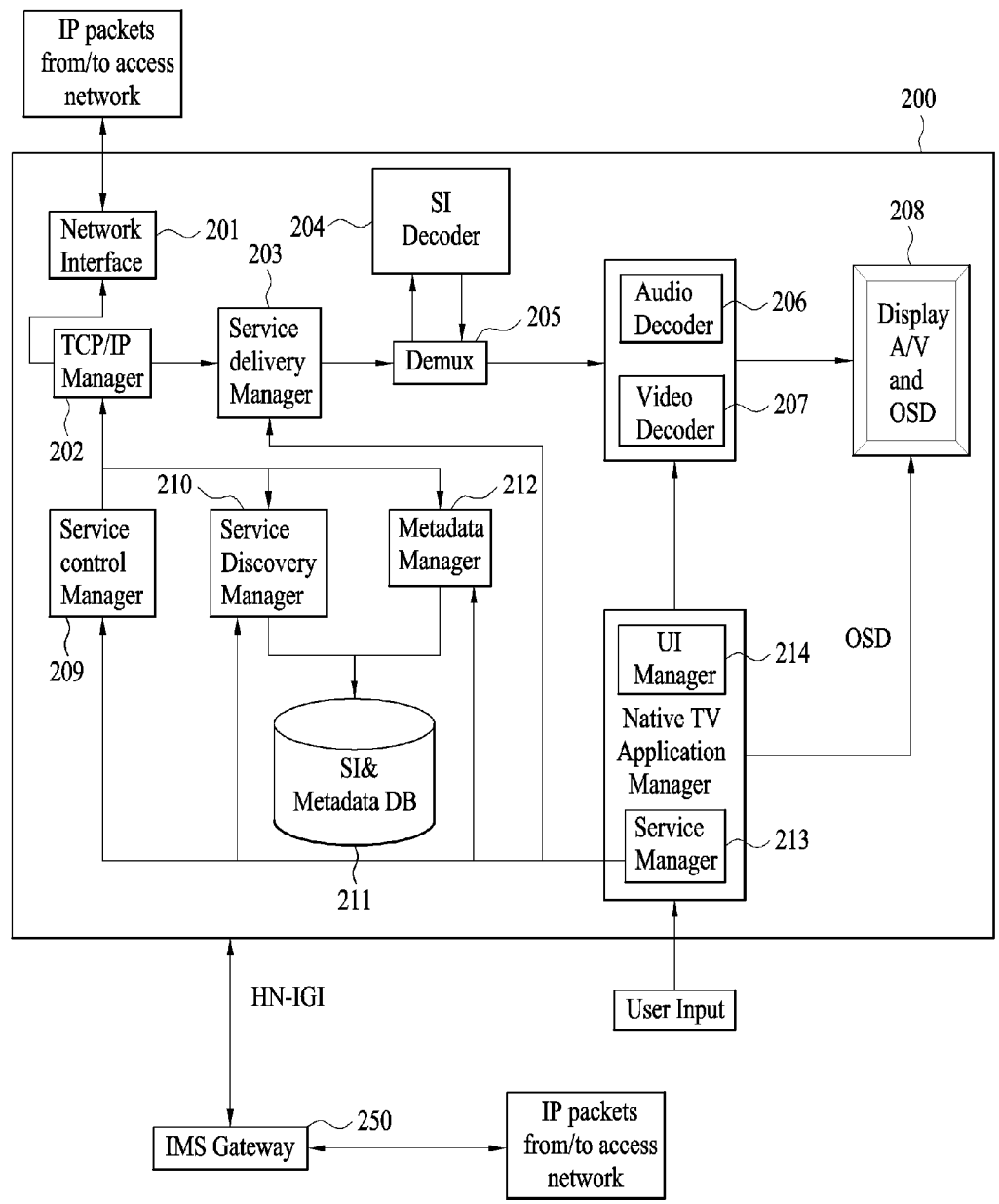
FIG. 2 is a block diagram showing a digital device according to one embodiment of the present invention.

FIG. 2 is a block diagram showing a digital device according to one embodiment of the present invention.

In the following, a digital device mentioned in the present specification may correspond to the client 100 shown in FIG. 1.

The digital device 200 may include a network interface 201, a TCP/IP manager 202, a service delivery manager 203, an SI decoder 204, a demux or demultiplexer 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI manager 214, etc.

The network interface 201 may transmit/receive IP (internet protocol) packet(s) or IP datagram(s) (hereinafter named IP pack(s)) through an accessed network. For instance, the network interface 201 may receive services, applications, contents and the like from the service provider 20 shown in FIG. 1 through a network.

The TCP/IP manager 202 may involve delivery of IP packets transmitted to the digital device 200 and IP packets transmitted from the digital device 200, that is, packet delivery between a source and a destination. The TCP/IP manager 202 may classify received packet(s) according to an appropriate protocol and output the classified packet(s) to the service delivery manager 205, the service discovery manager 210, the service control manager 209, the metadata manager 212, and the like.

The service delivery manager 203 may be in charge of controlling the received service data. The service delivery manager 203 may control real-time streaming data, for example, using RTP/RTCP. In case of transmitting the real-time streaming data using RTP, the service delivery manager 203 may parse the received data packet according to the RTP and then transmits the parsed data packet to the demultiplexer 205 or save the parsed data packet to the SI & metadata DB 211 under the control of the service manager 213. The service delivery manager 203 may feed back the network reception information to the service providing server side using RTCP.

The demultiplexer 205 may demultiplex a received packet into audio data, video data, SI (system information) data and the like and then transmit the demultiplexed data to the audio/video decoder 206/207 and the SI decoder 204, respectively.

The SI decoder 204 may decode the demultiplexed SI data, i.e., service informations of PSI (Program Specific Information), PSIP (Program and System Information Protocol), DVB-SI (Digital Video Broadcasting-Service Information), DTMB/CMMB (Digital Television Terrestrial Multimedia Broadcasting/Coding Mobile Multimedia Broadcasting), etc. And, the SI decoder 204 may save the decoded service informations to the SI & metadata DB 211. The saved service information can be used by being read by a corresponding component in response to a user's request for example.

The audio decoder 206 and the video decoder 207 may decode the demultiplexed audio data and the demultiplexed video data, respectively. The decoded audio and video data may be provided to the user through the display unit 208.

The application manager includes a service manager 213 and a user interface (UI) manager 214 and is able to perform a function of a controller of the digital device 200. So to speak, the application manager can administrate the overall states of the digital device 200, provide a user interface (UI), and manage other mangers.

The UI manager 214 provides a graphical user interface/user interface (GUI/UI) using OSD (on screen display) and the like. The UI manager 214 receives a key input from a user and then performs a device operation according to the input. For instance, if receiving a key input about a channel selection from a user, the UI manager 214 transmits the key input signal to the service manager 213.

The service manager 213 may control and manage service-related managers such as the service delivery manager 203, the service discovery manager 210, the service control manager 209, and the metadata manager 212.

The service manager 213 creates a channel map and controls a selection of a channel and the like using the created channel map in response to a key input received from the UI manager 214. The service manager 213 may receive service information from the SI decoder 204 and then sets an audio/video PID of a selected channel for the demultiplexer 205. Such a PID can be used for the demultiplexing procedure. Therefore, the demultiplexer 205 performs filtering (PID or section filtering) on audio data, video data and SI data using the PID.

The service discovery manager 210 may provide information required to select a service provider that provides a service. Upon receipt of a signal for selecting a channel from the service manager 213, the service discovery manager 210 searches for a service using the information.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service. The RTSP protocol can provide a trick mode for real-time streaming. And, the service control manager 209 may initialize and manage a session through the IMS gateway 250 using IMS (IP multimedia subsystem) and SIP (session initiation protocol). The protocols are exemplary, and other protocols are usable according to implementations.

The metadata manager 212 may manage metadata associated with services and save the metadata to the SI & metadata DB 211.

The SI & metadata DB 211 may store service information decoded by the SI decoder 204, metadata managed by the metadata manager 212, and information required to select a service provider, which is provided by the service discovery manager 210. In addition, the SI & metadata DB 211 can store system set-up data and the like for the system.

The SI & metadata database 211 may be implemented with non-volatile RAM (NVRAM), flash memory and the like.

Meanwhile, an IMS gateway 250 is a gateway in which functions required for an access to an IMS based IPTV service are collected.

Figure 3:
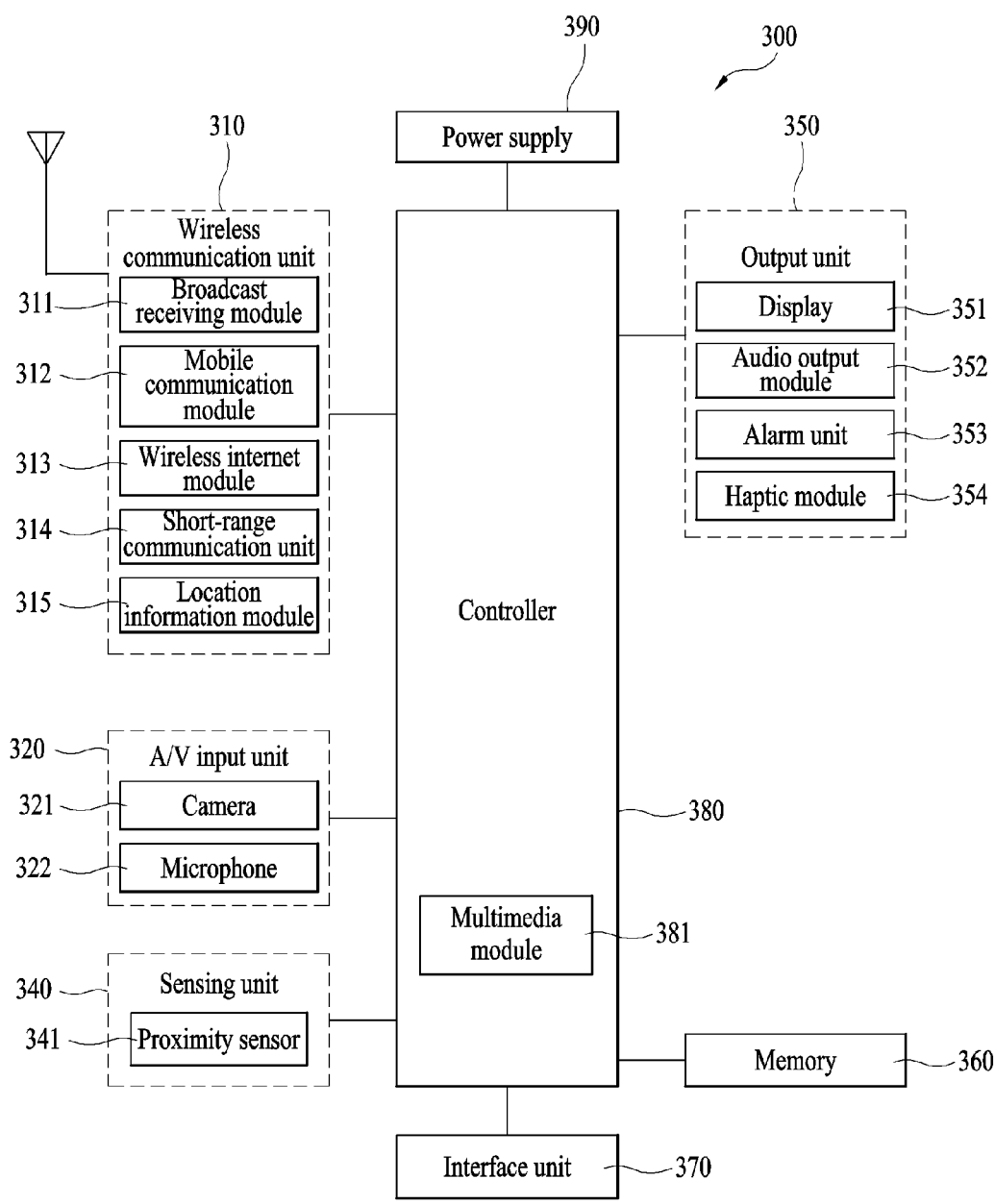
FIG. 3 is a block diagram showing the configuration of a digital device according to another embodiment of the present invention.

FIG. 3 is a block diagram to describe a digital device according to another embodiment of the present invention.

The former description with reference to FIG. 2 is made by taking a standing device as one embodiment of a digital device. And, FIG. 3 uses a mobile device as another embodiment of a digital device.

Referring to FIG. 3, the mobile device 300 includes a wireless communication unit 310, an A/V (audio/video) input unit 320, a user input unit 330, a sensing unit 340, an output unit 350, a memory 360, an interface unit 370, a controller 380, a power supply unit 390, etc.

The respective components are described in detail as follows.

The wireless communication unit 310 typically includes one or more modules which permit wireless communication between the mobile device 300 and a wireless communication system or network within which the mobile device 300 is located. For instance, the wireless communication unit 310 can include a broadcast receiving module 311, a mobile communication module 312, a wireless Internet module 313, a short-range communication module 314, a location information module 315, etc.

The broadcast receiving module 311 receives a broadcast signal and/or broadcast associated information from an external broadcast managing server via a broadcast channel. The broadcast channel may include a satellite channel and a terrestrial channel. The broadcast managing server may mean a server generating to send a broadcast signal and/or broadcast associated information or a server receiving to send a pre-generated broadcast signal and/or broadcast associated information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms, e.g., an electronic program guide (EPG), an electronic service guide (ESG), and the like.

The broadcast receiving module 311 may be configured to receive digital broadcast signals using broadcasting systems such as ATSC, DVB-T (Digital Video Broadcasting-Terrestrial), DVB-S (Satellite), MediaFLO (Media Forward Link Only), DVB-H (Handheld), ISDB-T (Integrated Services Digital Broadcast-Terrestrial), and the like. Optionally, the broadcast receiving module 311 can be configured to be suitable for other broadcasting systems as well as the above-noted digital broadcasting systems.

The broadcast signal and/or broadcast associated information received by the broadcast receiving module 311 may be saved to the memory 360.

The mobile communication module 312 transmits/receives wireless signals to/from at least one of a base station, an external terminal, and a server via a mobile network. Such wireless signals may carry audio signals, video signals, and data of various types according to transceived text/multimedia messages.

The wireless Internet module 313 includes a module for wireless Internet access and may be internally or externally coupled to the mobile device 300. The wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 314 is a module for short-range communications. Suitable technologies for implementing this module include Bluetooth, radio frequency identification (RFID), infrared data association (IrDA), ultra-wideband (UWB), ZigBee, RS232, RS-485 and the like.

The location information module 315 is a module for obtaining location information of the mobile terminal 100. And, this module may be implemented with a global positioning system (GPS) module for example.

The audio/video (A/V) input unit 320 is configured to provide audio or video signal input. The A/V input unit 320 may include a camera 321, a microphone 322 and the like. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or transmitted externally via the wireless communication unit 310. Optionally, at least two cameras 321 can be provided according to the environment of usage.

The microphone 322 receives an external audio signal in call mode, recording mode, voice recognition mode, or the like. This audio signal is processed and converted into electrical audio data. The processed audio data is transformed into a format transmittable to a mobile communication base station via the mobile communication module 312 in call mode. The microphone 322 typically includes assorted noise cancelling algorithms to cancel noise generated in the course of receiving the external audio signal.

The user input unit 330 generates input data for a user to control an operation of the terminal. The user input unit 330 may include a keypad, a dome switch, a touchpad (e.g., static pressure/capacitance), a jog wheel, a jog switch, and/or the like.

The sensing unit 340 generates sensing signals for controlling operations of the mobile device 300 using status measurements of various aspects of the mobile terminal. For instance, the sensing unit 340 may detect an open/closed status of the mobile device 300, a location of the mobile device 300, an orientation of the mobile device 300, a presence or absence of user contact with the mobile device 300, an acceleration/deceleration of the mobile device 300, and the like. For example, if the mobile device 300 is moved or inclined, it is able to sense a location or inclination of the mobile device. Moreover, the sensing unit 340 may sense a presence or absence of power provided by the power supply unit 390, a presence or absence of a coupling or other connection between the interface unit 370 and an external device, and the like. Meanwhile, the sensing unit 340 may include a proximity sensor 341 such as NFC (near field communication) and the like.

The output unit 350 generates output relevant to the senses of vision, hearing and touch, and may include the display 351, an audio output module 352, an alarm unit 353, a haptic module 354, and the like.

The display 351 is typically implemented to visually display (output) information processed by the mobile device 300. For instance, if the mobile terminal is operating in phone call mode, the display will generally provide a user interface (UI) or graphical user interface (GUI) related to a phone call. For another instance, if the mobile device 300 is in video call mode or photographing mode, the display 351 may display photographed or/and received images or UI/GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile device 300 may include one or more of such displays.

Some of the displays can be implemented in a transparent or optical transmittive type, which can be called a transparent display. A representative example of the transparent display is the TOLED (transparent OLED). A rear configuration of the display 351 can be implemented as the optical transmittive type as well. In this configuration, a user may be able to see an object located in rear of a terminal body through a region occupied by the display 351 of the terminal body.

Two or more displays 351 can be provided to the mobile device 300 in accordance with an implementation type of the mobile device 300. For instance, a plurality of displays can be disposed on the mobile device 300 in a manner of being spaced apart from a single face or being integrally formed on a single face. Alternatively, a plurality of displays may be disposed on different faces of the mobile device 300, respectively.

If the display 351 and a sensor (hereinafter called 'touch sensor') for detecting a touch action configure a mutual layer structure, the display 351 is usable as an input device as well as an output device. In this case, the touch sensor can be configured with a touch film, a touch sheet, a touchpad, or the like.

The touch sensor can be configured to convert a pressure applied to a specific portion of the display 351 or a variation of capacitance generated from a specific portion of the display 351 into an electrical input signal. Moreover, the touch sensor is configurable to detect pressure of a touch as well as a touched position or size.

If a touch input is applied to the touch sensor, signal(s) corresponding to the touch input is transferred to a touch controller. The touch controller processes the signal(s) and then transfers the processed signal(s) to the controller 380. Therefore, the controller 380 is able to know whether a prescribed portion of the display 351 is touched.

A proximity sensor 341 can be disposed on an inner region of the mobile device enclosed by the touchscreen or near the touchscreen. The proximity sensor is a sensor that detects a presence or non-presence of an object approaching a prescribed detecting surface or an object existing around the proximity sensor using an electromagnetic field strength or infrared ray without mechanical contact. Hence, the proximity sensor is more durable than a contact type sensor and also has utility higher than that of the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, etc. If the touch screen includes the electrostatic capacity proximity sensor, it is configured to detect the proximity of a pointer using a variation of an electric field according to the proximity of the pointer. In this configuration, the touchscreen (or touch sensor) can be sorted into a proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or stored in the memory 360. During operation, the audio output module 352 may output an audio signal related to a function (e.g., call received, message received) executed in the mobile device 300. The audio output module 352 may include a receiver, a speaker, a buzzer and the like.

The alarm unit 353 outputs a signal for announcing the occurrence of an event of the mobile device 300. Typical events occurring in the mobile device may include a call signal received, a message received, a touch input received, and the like. The alarm unit 353 may output a signal for announcing the event occurrence by way of vibration as well as video or audio signal. The video or audio signal can be outputted via the display 351 or the audio output module 352. Hence, the display 351 or the audio output module 352 can be sorted into a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence. The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, two or more haptic modules 354 can be provided to the mobile device 300 in accordance with a configuration type of the mobile device 300.

The memory 360 may store a program for an operation of the controller 380, or may temporarily store inputted/outputted data (e.g., phonebook, message, still image, video, etc.). And, the memory 360 may store data of vibrations and sounds of various patterns outputted in response to a touch input to the touchscreen.

The memory 360 may be implemented using any type or combination of suitable volatile and non-volatile memory or storage devices, including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile device 300 is able to operate in association with the web storage for performing a storage function of the memory 360 on the Internet.

The interface unit 370 may play a role as a passage to every external device connected to the mobile device 300 with external devices. The interface unit 370 receives data from the external devices, delivers a supplied power to the respective elements of the mobile device 300, or enables data within the mobile device 300 to be transferred to the external devices. For instance, the interface unit 370 may include a wired/wireless headset port, an external charger port, a wired/wireless data port, a memory card port, a port for coupling to a device having an identity module, audio input/output ports, video input/output ports, an earphone port, and the like.

The identity module is a chip for storing various kinds of information for authenticating a use authority of the mobile device 300 and may include User Identify Module (UIM), Subscriber Identity Module (SIM), Universal Subscriber Identity Module (USIM), and the like. A device having the identity module (hereinafter called 'identity device') can be manufactured in form of a smart card. Therefore, the identity device is connectible to the mobile device 300 through a port.

When the mobile device 300 is connected to an external cradle, the interface unit 370 becomes a passage for supplying the mobile device 300 with a power from the cradle or a passage for delivering various command signals input from the cradle by a user to the mobile device 300. Each of the various command signals inputted from the cradle or the power can operate as a signal for recognizing that the mobile device 300 is correctly installed in the cradle.

The controller 380 typically controls the overall operations of the mobile device 300. For example, the controller 380 performs the control and processing associated with voice calls, data communications, video calls, and the like. The controller 380 may include a multimedia module 381 that provides multimedia playback. The multimedia module 381 may be configured as a part of the controller 380, or implemented as a separate component. Moreover, the controller 380 is able to perform a pattern recognition processing for recognizing a writing input and a picture drawing input performed on the touchscreen as a text and an image, respectively.

The power supply unit 390 is supplied with an external or internal power and then supplies a power required for an operation of each component, under the control of the controller 380.

Various embodiments described herein may be implemented in a recording medium readable by a computer or a device similar to the computer using software, hardware, or some combination thereof for example.

For hardware implementation, the embodiments described herein may be implemented within at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and a selective combination thereof. Such embodiments may also be implemented by the controller 380.

For software implementation, the embodiments described herein may be implemented with separate software modules, such as procedures and functions, each of which performs one or more of the functions and operations described herein. The software codes can be implemented with a software application written in any suitable programming language and may be stored in memory such as the memory 360, and executed by a controller or processor, such as the controller 380.

Figure 4:
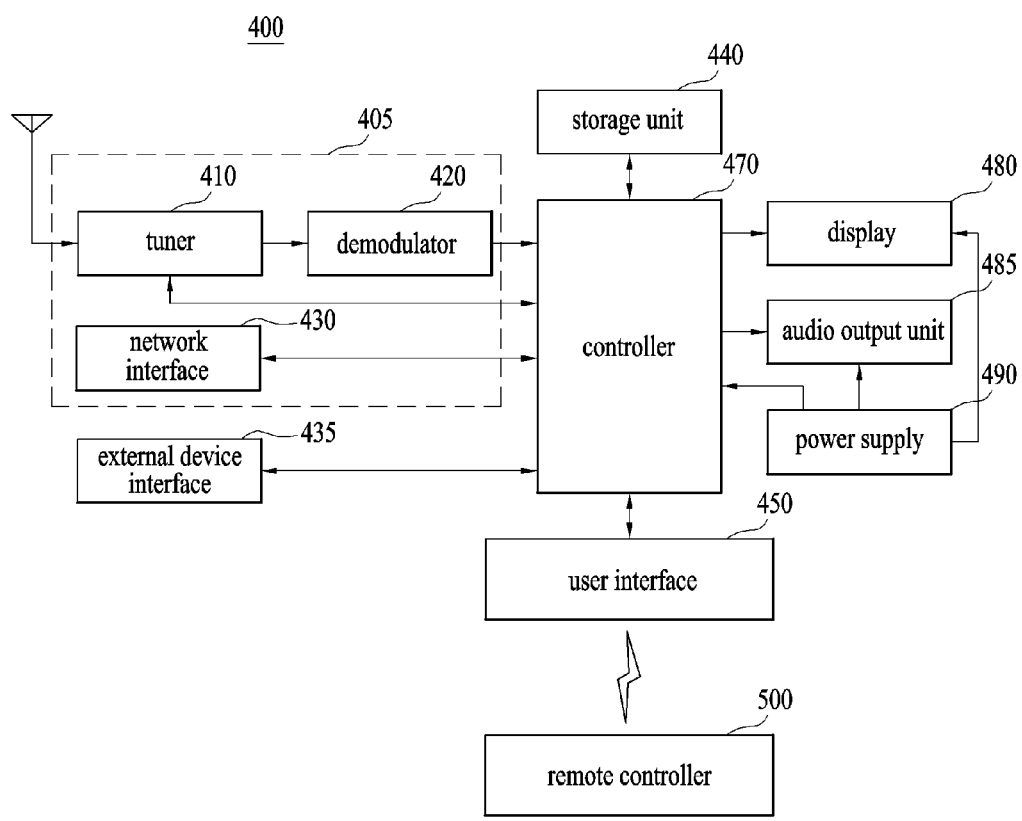
FIG. 4 is a diagram showing a digital device according to another embodiment of the present invention.

FIG. 4 is a block diagram showing a digital device according to another embodiment of the present invention.

Another example of a digital device 400 may include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 may include at least one of one or more tuner 410, a demodulator 420, and a network interface 430. Yet, in some cases, the broadcast receiving unit 405 may include the tuner 410 and the demodulator 420 without the network interface 430, or may include the network interface 430 without the tuner 410 and the demodulator 420. The broadcast receiving unit 405 may include a multiplexer (not shown) to multiplex a signal, which is subjected to the tuner 410 and demodulated by the demodulator 420, and a signal received through the network interface 40. In addition, the broadcast receiving unit 405 can include a demultiplexer (not shown) and demultiplex a multiplexed signal, a demodulated signal, or a signal received through the network interface 430.

The tuner 410 may receive a radio frequency (RF) broadcast signal by tuning in to a channel selected by the user or all previously stored channels among RF broadcast signals received through an antenna. And, the tuner 410 converts the received RF broadcast signal into an IF (intermediate frequency) signal or a baseband signal.

For instance, if a received RF broadcast signal is a digital broadcast signal, it is converted into a digital IF (DIF) signal. If a received RF broadcast signal is an analog signal, it is converted into an analog baseband video/audio signal (CVBS/SIF). Namely, the tuner 410 is able to process both of the digital broadcast signal and the analog signal. The analog baseband video/audio signal (CVBS/SIF) outputted from the tuner 410 may be directly inputted to the controller 470.

The tuner 410 may receive an RF broadcast signal of a single carrier or multiple carriers. The tuner 410 sequentially tunes in to and receives RF broadcast signals of all broadcast channels stored through the channel memory function among RF broadcast signals received through the antenna and is then able to convert it into an intermedia frequency signal or a baseband signal (DIF: digital intermediate frequency or baseband signal).

The demodulator 420 receives and demodulates the digital IF signal (DIF) converted by the tuner 410 and is then able to channel decoding and the like. To this end, the demodulator 420 may include a Trellis decoder, a de-interleaver, a Reed-Solomon decoder and the like, or may include a convolution decoder, a de-interleaver, a Reed-Solomon decoder and the like.

The demodulator performs demodulation and channel decoding and is then able to output a stream signal TS. In this case, the stream signal may include a signal of multiplexing a video signal, an audio signal and/or a data signal. For instance, the stream signal may include MPEG-2TS (transport stream) in which a video signal of PMEG-2 and an audio signal of Dolby AC-3 are multiplexed.

The stream signal outputted from the demodulator 420 may be inputted to the controller 470. The controller 470 can control demultiplexing, audio/video signal processing, etc. Furthermore, the controller 470 can control outputs of video and audio through the display 480 and o the audio output unit 485, respectively.

The external device interface 435 may provide an interfacing environment between the digital device 300 and various external devices. To this end, the external device interface 435 may include an A/V input/output unit (not shown) or a wireless communication unit (not shown).

The external device interface 435 can be connected with external devices such as a digital versatile disk (DVD), a Blu-ray player, a game device, a camera, a camcorder, a computer (notebook computer), a tablet PC, a smartphone, a cloud and the like by wire/wireless. The external device interface 435 delivers a signal containing data such as an image, a video, an audio and the like, which is inputted through the connected external device, to the controller 470 of the digital device. The controller 470 may control a data signal of the processed image, video and audio and the like to be outputted to the connected external device. To this end, the external device interface 435 may further include an A/V input/output unit (not shown) or a wireless communication unit (not shown).

In order to input video and audio signals of an external device to the digital device 400, the A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The wireless communication unit can perform short-range wireless communication with another digital device. The digital device 400 may be networked with other digital devices by communication protocols such as Bluetooth, radio frequency identification (RFID), infrared data association (IrDA), ultra wideband (UWB), ZigBee, and digital living network alliance (DLNA), etc. for example.

The external device interface 435 may perform input/output operations with a set-top box (STB) by being connected thereto through at least one of the aforementioned terminals.

Meanwhile, the external device interface 435 may receive an application or an application list within an adjacent external device and then forward it to the controller 470 or the storage unit 440.

The network interface 430 may provide an interface for connecting the digital device 400 to wired/wireless networks including Internet network. The network interface 430 may have Ethernet terminal and the like for an access to a wired network for example. For the access to the wireless network, the network interface 430 may use communication specifications such as WLAN (Wireless LAN) (Wi-Fi), Wibro (Wireless broadband), Wimax (World Interoperability for Microwave Access), HSDPA (High Speed Downlink Packet Access), etc.

The network interface 430 may transceive data with another user or another digital device through the accessed network or another network linked to the accessed network. Particularly, the network interface 430 may send a portion of the content data stored in the digital device 400 to a user/digital device selected from other users/digital devices previously registered at the digital device 400.

Meanwhile, the network interface 430 may access a prescribed webpage through the accessed network or another network linked to the accessed network. Namely, the network interface 430 accesses a prescribed webpage through a network and is then able to transceive data with a corresponding server. Besides, the network interface 430 can receive contents or data provided by a content provider or a network operator. Namely, the network interface 430 may receive contents (e.g., movie, advertisement, game, VOD, broadcast signal, etc.) provided by the content provider or a network provider and information associated with the contents through the network. The network interface 430 may receive update information and file of firmware provided by the network operator. And, the network interface 430 may send data to the internet or content provider or the network operator.

Moreover, the network interface 430 may select a desired application from open applications and receive it through a network.

The storage unit 440 may store programs for various signal processing and controls within the controller 470, and may also store a processed video, audio or data signal.

In addition, the storage unit 440 may execute a function of temporarily storing a video, audio or data signal inputted from the external device interface 435 or the network interface 430. The storage unit 440 may store information on a prescribed broadcast channel through a channel memory function.

The storage unit 440 may store an application or an application list inputted from the external device interface 435 or the network interface 430.

And, the storage unit 440 may store various platforms which will be described later.

The storage unit 440 may include storage media of one or more types, such as a flash memory type, a hard disk type, a multimedia card micro type, a card type memory (e.g. SD or XD memory), RAM, EEPROM, etc. The digital device 400 may play content files (a video file, a still image file, a music file, a text file, an application file, etc.) stored in the storage unit 440 and provide them to the user.

FIG. 4 illustrates an embodiment in which the storage unit 440 is separated from the controller 470, by which the present invention is non-limited. In other words, the storage unit 440 may be included in the controller 470.

The user input interface 450 may forward a signal inputted by a user to the controller 470 or forward a signal outputted from the controller 470 to the user.

For example, the user input interface 450 may receive control signals for power on/off, channel selection, screen settings and the like from a remote controller 500, or transmit control signals of the controller 470 to the remote controller 500, according to various communication schemes such as RF communication, IR communication, and the like.

The user input interface 450 can forward control signals inputted through a power key, a channel key, a volume key, and a local key (not shown) for a setup value or the like to the controller 470.

The user input interface 450 may forward a control signal inputted from a sensing unit (not shown) sensing a gesture of a user to the controller 470 or transmit a signal of the controller 470 to the sensing unit (not shown). Here, the sensing unit (not shown) may include a touch sensor, a voice sensor, a location sensor, an action sensor, etc.

The controller 470 may generate and output a signal for a video or audio output by demultiplexing a stream inputted through the tuner 410, the demodulator 420 or the external device interface 435 or processing demultiplexed signals.

A video signal processed by the controller 470 can be inputted to the display unit 380 and displayed as an image corresponding to the video signal. In addition, the video signal video-processed by the controller 470 can be inputted to an external output device through the external device interface 435.

An audio signal processed by the controller 470 can be audio-outputted to the audio output unit 485. Moreover, the audio signal processed by the controller 470 can be inputted to the external output device through the external device interface 435.

The controller 470 may include a demultiplexer, an image processor, and the like, which are not shown in FIG. 4.

The controller 470 can control the overall operations of the digital device 400. For example, the controller 470 can control the tuner 410 to tune in to an RF broadcast corresponding to a channel selected by a user or a previously stored channel.

The controller 470 can control the digital device 400 according to a user command input through the user input interface 450 or an internal program. Particularly, the controller 470 can control the digital device 400 to access a network to download an application or an application list desired by a user to the digital device 400.

For example, the controller 470 may control the tuner 410 to receive a signal of a channel selected in response to a prescribed channel selection command received through the user input interface 450. And, the controller 470 may process a video, audio or data signal of the selected channel. The controller 470 may control information on a channel selected by the user to be outputted together with a processed video or audio signal through the display unit 480 or the audio output unit 485.

For another example, the controller 470 may control a video signal or an audio signal, which is inputted through the external device interface unit 435 from an external device (e.g., a camera or a camcorder), to be outputted through the display unit 480 or the audio output unit 485 in response to an external device image play command received through the user input interface 450.

Meanwhile, the controller 470 can control the display unit 480 to display a video. For example, the controller 470 can control a broadcast video inputted through the tuner 410, an external input video inputted through the external device interface 435, a video inputted through the network interface 430, or a video stored in the storage unit 440 to be displayed on the display unit 480. Here, the video displayed on the display unit 480 may include a still image or moving images or may include a 2D or 3D video.

The controller 470 may control a content to be played. Here, the content may include a content stored in the digital device 400, a received broadcast content, or a content inputted externally. The content may include at least one of a broadcast video, an external input video, an audio file, a still image, an accessed web screen, and a document file.

The controller 470 may control an application or an application list, which is located in the digital device 300 or downloadable from an external network, to be displayed when an application view menu is entered.

The controller 470 may control installation and execution of applications downloaded from an external network together with various user interfaces. Moreover, the controller 470 can control a video related to a launched application to be displayed on the display unit 480 by a user's selection.

Meanwhile, a channel browsing processor (not shown) configured to generate a thumbnail image corresponding to a channel signal or an external input signal may be further included.

The channel browsing processor may receive an input of a stream signal (TS) outputted from the demodulator 420 or an input of a stream signal outputted from the external device interface 435, extract a video from the inputted stream signal, and then generate a thumbnail image. The generated thumbnail image can be directly inputted to the controller 470 or may be inputted to the controller 470 by being encoded. Moreover, the generated thumbnail image may be encoded into a stream and then inputted to the controller 470. The controller 470 may display a thumbnail list including a plurality of thumbnail images on the display unit 480 using the inputted thumbnail images. The thumbnail images included in the thumbnail list can be updated sequentially or simultaneously. Accordingly, the user can conveniently check content of a plurality of broadcast channels.

The display unit 480 may convert each of a video signal, a data signal, and an OSD signal processed by the controller 470 or each of a video signal and a data signal received from the external device interface 435 into R, G and B signals to generate a drive signals.

The display unit 480 may include a PDP, an LCD, an OLED, a flexible display, a 3D display, or the like.

The display unit 480 may be configured as a touchscreen and used as an input device as well as an output device.

The audio output unit 485 receives a signal audio-processed by the controller 470, for example, a stereo signal, a 3.1 channel signal or a 5.1 channel signal, and then outputs the received signal as audio. The audio output unit 485 may be configured as one of speakers of various types.

Meanwhile, the digital device 400 may further include the sensing unit (not shown) for sensing a gesture of the user, which includes at least one of a touch sensor, a voice sensor, a location sensor, and an action sensor, as described above. A signal sensed by the sensing unit (not shown) can be delivered to the controller 470 through the user input interface 450.

The digital device 400 may further include a photographing unit (not shown) for photographing a user. Image information acquired by the photographing unit (not shown) can be inputted to the controller 470.

The controller 470 may sense a gesture of a user from an image captured by the photographing unit (not shown) or a signal sensed by the sensing unit (not shown), or by combining the image and the signal.

The power supply unit 490 may supply a corresponding power to the digital device 400 overall.

Particularly, the power supply unit 490 can supply the power to the controller 470 configurable as a system-on-chip (SoC), the display unit 480 for a video display, and the audio output unit 485 for an audio output.

To this end, the power supply unit 490 may include a converter (not shown) configured to convert an AC power to a DC power. Meanwhile, for example, if the display unit 480 is configured as an LCD panel having a multitude of backlight lamps, the power supply unit 490 may further include an inverter (not shown) capable of PWM (pulse width modulation) operation for luminance variation or dimming drive.

The remote controller 500 sends a user input to the user input interface 450. To this end, the remote controller 500 can use Bluetooth, RF communication, IR communication, UWB, ZigBee, etc.

In addition, the remote controller 500 can receive audio, video or data signal outputted from the user input interface 450 and then display the received signal or output the same as audio or vibration.

The above-described digital device 400 may include a digital broadcast receiver capable of processing digital broadcast signals of ATSC or DVB of a stationary or mobile type.

Regarding the digital device according to the present invention, some of the illustrated components may be omitted or new components (not shown) may be further added as required. On the other hand, the digital device may not include the tuner and the demodulator, differently from the aforementioned digital device, and may play a content by receiving the content through the network interface or the external device interface.

Figure 5:
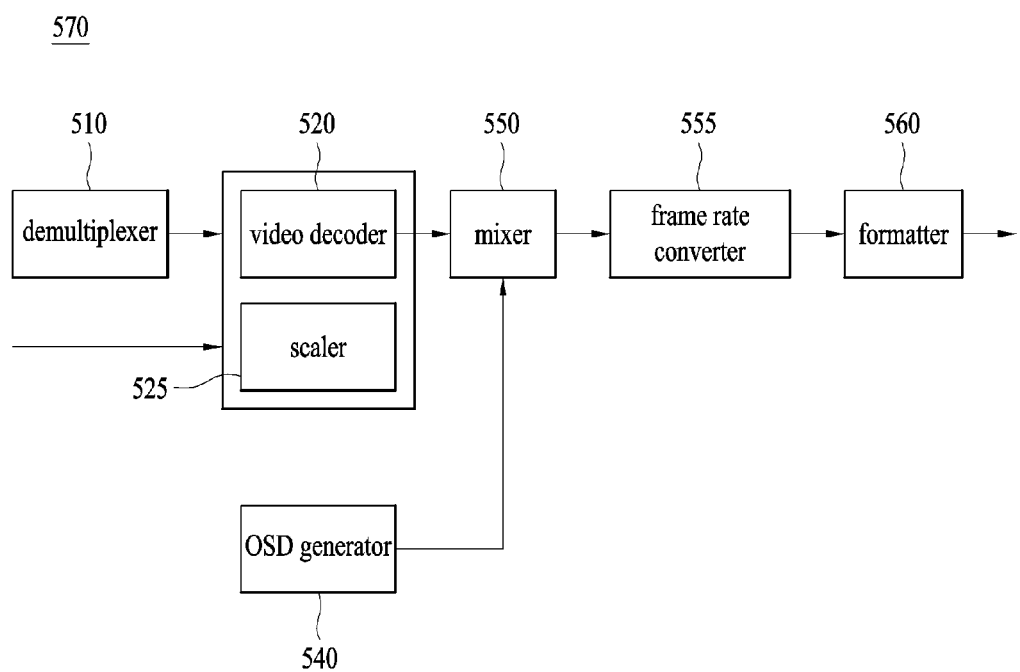
FIG. 5 is a block diagram showing the detailed configuration of each of controllers of FIGS. 2 to 4 according to one embodiment of the present invention.

FIG. 5 is a block diagram showing the detailed configuration of each of controllers of FIGS. 2 to 4 according to one embodiment of the present invention.

One example of the controller may include a demultiplexer 510, a video processor 520, an OSD generator 540, a mixer 550, a frame rate converter (FRC) 555, and a formatter 560. Besides, the controller may further include an audio processor and a data processor (not shown).

The demultiplexer 510 demultiplexes an inputted stream. For instance, the demultiplexer 510 can demultiplex an inputted stream signal into an MPEG-2 TS video, audio and data signals. Herein, the stream signal inputted to the demultiplexer may include a stream signal outputted from the tuner, demodulator or external device interface.

The video processor 520 performs a video processing of the demultiplexed video signal. To this end, the video processor 520 may include a video decoder 525 and a scaler 535.

The video decoder 525 can decode the demultiplexed video signal, and the scaler 535 can scale the resolution of the decoded video signal to be outputtable from the display.

The video decoder 525 can support various specifications. For instance, the video decoder 525 performs a function of MPEG-2 decoder if a video signal is encoded by MPEG-2. And, the video decoder 535 performs a function of H.264 decoder if a video signal is encoded by DMB (digital multimedia broadcasting) or H.264.

Meanwhile, the video signal decoded by the image processor 520 is inputted to the mixer 550.

The OSD generator 540 may generate OSD data according to a user input or by itself. For example, the OSD generator 540 may generate data to be displayed on the screen of the display 380 in the graphic or text form on the basis of a control signal of a user input interface. The generated OSD data may include various data such as a user interface screen of the digital device, various menu screens, widgets, icons, viewing rate information and the like. The OSD generator 540 can generate data to display a caption of a broadcast video or EPG based broadcast information.

The mixer 550 mixes the OSD data generated by the OSD generator 540 and the video signal processed by the video processor 520. The mixer 550 then provides the mixed signal to the formatter 560. By mixing the decoded video signal and the OSD data, OSD is displayed in a manner of overlaying a broadcast video or an external input video.

The frame rate converter (FRC) 555 may convert a frame rate of an inputted video. For example, the frame rate converter 555 can convert the frame rate of an inputted 60 Hz video into a frame rate of 120 Hz or 240 Hz according to an output frequency of the display unit. As described above, there may exist various methods of converting a frame rate. For instance, in case of converting a frame rate into 120 HZ from 60 Hz, the frame rate converter 555 can perform the conversion by inserting a first frame between the first frame and a second frame or inserting a third frame predicted from the first and second frames. For another instance, in case of converting a frame rate into 240 Hz from 60 Hz, the frame rate converter 555 can perform the conversion by further inserting three same or predicted frames between the existing frames. Meanwhile, in case of not performing a separate frame conversion, the frame rate converter 555 may be bypassed.

The formatter 560 may change the output of the frame rate converter 555, which is inputted thereto, to fit an output format of the display unit. For example, the formatter 560 can output an RGB data signal. In this case, this RGB data signal can be outputted as low voltage differential signal (LVDS) or mini-LVDS. If an inputted output of the frame rate converter 555 is a 3D video signal, the formatter 560 outputs the signal by configuring a 3D format to fit the output format of the display unit, whereby a 3D service can be supported through the display unit.

Meanwhile, an audio processor (not shown) in the controller can perform audio processing of a demultiplexed audio signal. Such an audio processor (not shown) can provide supports to process various audio formats. For instance, if an audio signal is encoded in format of MPEG-2, MPEG-4, AAC, HE-AAC, AC-3, BSAC, or the like, a corresponding decoder is further included to process the audio signal.

And, the audio processor (not shown) in the controller can process base, treble, volume adjustment and the like.

A data processor (not shown) in the controller can process a demultiplexed data signal. For example, when a demultiplexed data signal is encoded, the data processor can decode the encoded demultiplexed data signal. Here, the encoded data signal may be EPG information including broadcast information such as start and end times of a broadcast program broadcasted on each channel, and the like.

Meanwhile, the above-described digital device is one example according to the present invention. And, at least one of the components may be integrated, added or omitted depending on options of an actually embodied digital device. In particular, if necessary, at least two or more components can be integrated into a single component or a prescribed component can be divided into at least two or more components. Moreover, a function performed by each block is provided to describe one embodiment of the present invention. A detailed operation or device for the function may non-limit the scope of the appended claims and their equivalents of the present invention.

Meanwhile, a digital device may include an image signal processing device configured to process a signal of an image saved in the corresponding device or a signal of an inputted image. Examples of the image signal processing device may include a settop box (STB) failing to include the display unit 480 and the audio output unit 485 shown in FIG. 4, the aforementioned DVD player, a Blu-ray player, a game device, a computer and the like.

Figure 6:
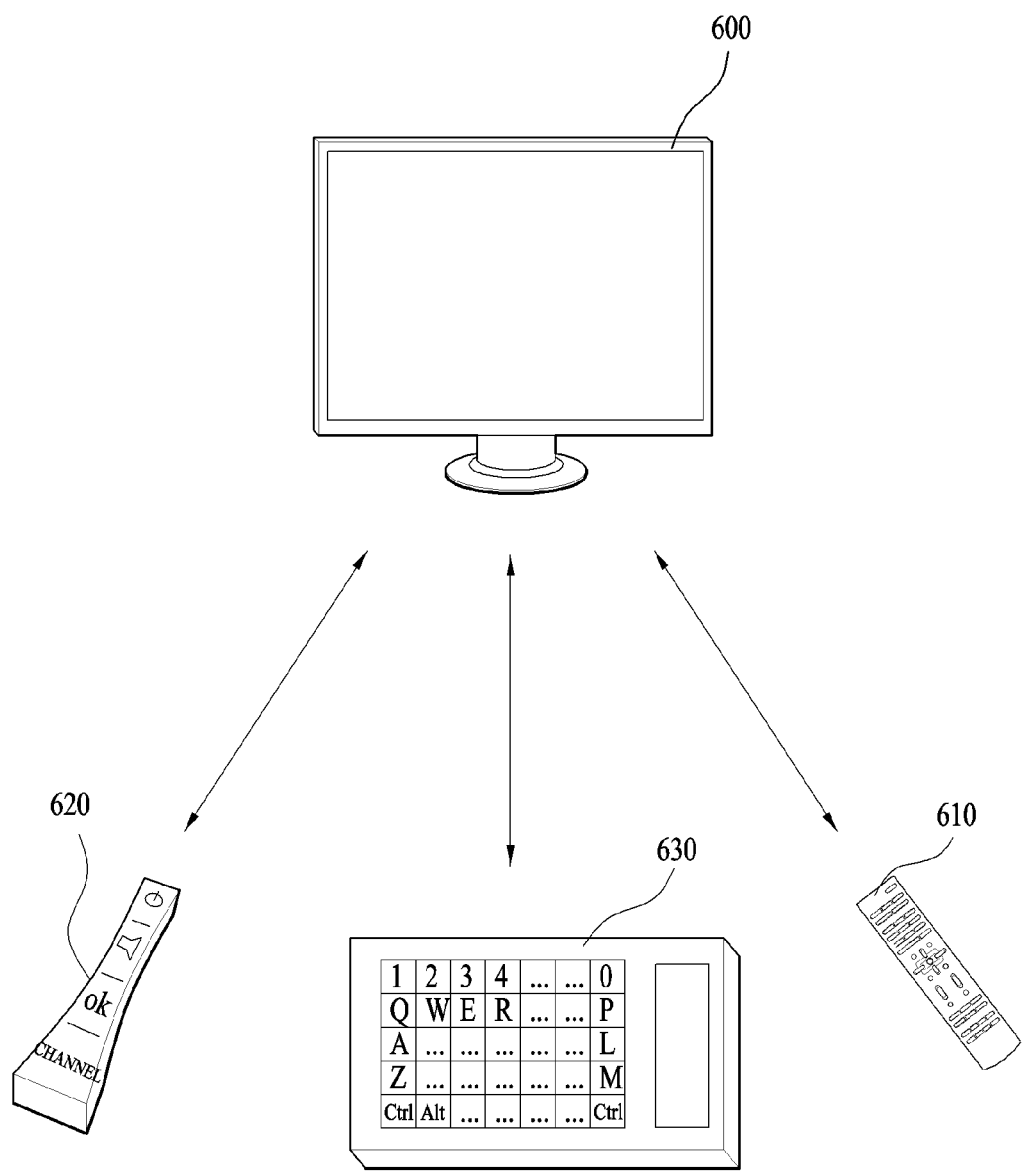
FIG. 6 is a diagram showing an input unit connected to each of the digital devices of FIGS. 2 to 4 according to one embodiment of the present invention.

FIG. 6 is a diagram of an input means connected to each of the digital devices shown in FIGS. 2 to 4 according to one embodiment of the present invention.

In order to control a digital device 600, a front panel (not shown in the drawing) or a control means (e.g., an input means) installed in the digital device 600 is used.

Meanwhile, as a user interface device (UID) capable of a wire/wireless communication, the control means includes a remote controller 610, a key board 630, a pointing device 620, a touchpad, or the like, mainly embodied for the purpose of controlling the digital device 600. And, a control means dedicated to an external input by being connected to the digital device 600 may be included as well. Besides, the control means may further include a mobile device (e.g., a smartphone, a tablet PC, etc.) capable of controlling the digital device 600 through a mode switching or the like despite not having the purpose of controlling the digital device 600. For clarity, a pointing device is taken as one example for the description in the present specification, by which the present invention is non-limited.

The input means can communicate with the digital device by employing at least one of communication protocols as necessary. In this case, the communication protocols may include Bluetooth, RFID (Radio Frequency Identification), IrDA (infrared Data Association), UWB (Ultra Wideband), ZigBee, DLNA (Digital Living Network Alliance), RS and the like.

The remote controller 610 is a general input means provided with various key buttons required for controlling the digital device 600.

The pointing device 620 provided with a gyro sensor and the like delivers a prescribed control command to the digital device 600 by embodying a corresponding pointer on a screen of the digital device 600 based on a user's motion, a pressure, a rotation and the like. The pointing device 620 may be called one of various names such as a magic remote controller, a magic controller and the like.

As the digital device 600 is an intelligence integrated digital device capable of providing various services such as a web browser, an application, an SNS (social network service) and the like as well as broadcasts, it is difficult to control the digital device 600 using a conventional remote controller 610. Hence, the keyboard 630 is embodied into a configuration similar to a PC keyboard to facilitate inputs of text and the like by complementing the control difficulty.

Meanwhile, the control means such as the remote controller 610, the pointing device 620, the keyboard 630, or the like is provided with a touchpad as necessary and is usable for the various control purposes of facilitating text inputs, pointer shifts, zoom-in/out of photo or video, and the like.

The digital device described in the present specification uses OS and/or WebOS as a platform. Hereinafter, such a processing as a WebOS based configuration or algorithm may be performed by the controller of the above-described digital device and the like. In this case, the controller is used in a broad sense including the controllers shown in FIGS. 2 to 5. Hence, in the following description, regarding a configuration for processing WebOS based or related services, applications, contents and the like in a digital device, hardware or component including software, firmware and the like is named a controller.

Such a WebOS based platform may improve development independency and functional extensibility by integrating services, applications and the like based on Luna-service Bus for example and is able to increase application development productivity based on a web application framework. In addition, system resources and the like are efficiently used through a WebOS process and resource management, whereby multitasking can be supported.

Meanwhile, a WebOS platform described in the present specification may be available not only for stationary devices such as personal computers (PCs), TVs and settop boxes (STBs) but also for mobile devices such as cellular phones, smartphones, tablet PCs, laptops, wearable devices, and the like.

A software structure for a digital device is a monolithic structure capable of solving conventional problems depending on markets and has difficulty in external application with a multi-threading based signal process and closed product. In pursuit of new platform based development, cost innovation through chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
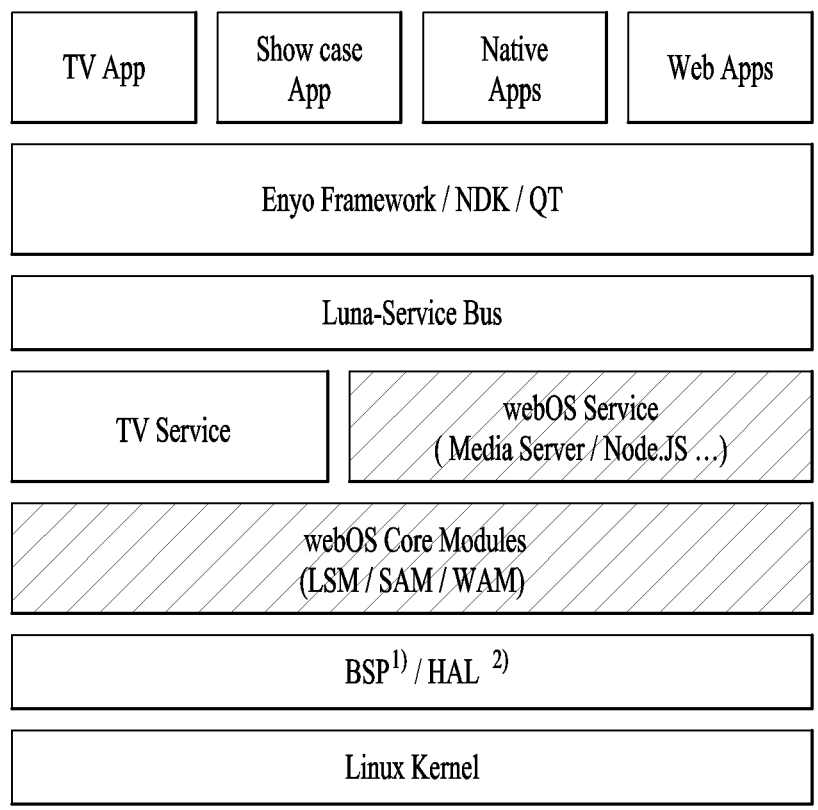
FIG. 7 is a diagram showing webOS architecture according to one embodiment of the present invention.

FIG. 7 is a diagram showing webOS architecture according to one embodiment of the present invention.

The architecture of webOS platform is described with reference to FIG. 7 as follows.

The platform can be mainly classified into a system library based webOS core platform, an application, a service and the like.

The architecture of the webOS platform includes a layered structure. OS, system library(s), and applications exist in a lowest layer, a next layer and a most upper layer, respectively.

First of all, regarding the lowest layer, as a Linux kernel is included as an OS layer, Linux may be included as an OS of the digital device.

Above the OS layer, BSP/HAL (Board Support Package/Hardware Abstraction layer, webOS core modules layer, service layer, Luna-Service Bus layer, Enyo framework/NDK (Native Developer's Kit)/QT layer, and an application layer (as a most upper layer) exist in order.

Meanwhile, some layers can be omitted from the aforementioned webOS layer structure. A plurality of layers can be integrated into a single layer, and vice versa.

The webOS core module layer may include LSM (Luna Surface Manager) for managing a surface window and the like, SAM (System & Application Manage) for managing launch, running state and the like of an application, WAM (Web Application Manager) for managing Web application and the like based on WebKit, etc.

The LSM manages an application window appearing on a screen. The LSM is in charge of a display hardware (HW), provides a buffer capable of rendering substance required for applications, and outputs a composition of rendering results of a plurality of application to a screen.

The SAM manages a performance policy per conditions of system and application.

Meanwhile, since webOS may regard a web application (Web App) as a basic application, the WAM is based on Enyo Framework.

A service use of application is performed through Luna-service Bus. A service may be newly registered at the Bus, and an application can find and use a service required for itself.

The service layer may include services of various service levels such as TV service, webOS service and the like. Meanwhile, the webOS service may include a media server, a Node.JS and the like. Particularly, Node.JS service supports javascript for example.

The webOS service is Linux process of implementing a function logic and can communicate through Bus. This can be mainly divided into four parts and is constructed with a TV process, services migrating into webOS from an existing TV or services corresponding to manufacturer-differentiated services, webOS common service, and Node.js service developed with javascript and used through Node.js.

The application layer may include all applications supportable by the digital device, e.g., TV application, showcase application, native application Web application, etc.

Application on webOS may be sorted into Web Application, PDK (Palm Development Kit) application, QML (Qt Meta Language or Qt Modeling Language) application and the like according to implementing methods.

The Web Application is based on WebKit engine and is run on WAM Runtime. Such a web application is based on Enyo Framework or may be run in a manner of being developed based on general HTML5, CSS (cascading style sheets), and javascript.

The PDK application includes a native application and the like developed with C/C++ based on PDK provided for a $3^{rd}$ party or an external developer. The PDK means a set of development libraries and tools provided to enable a third party (e.g., a game, etc.) to develop a native application (C/C++). The PDK application can be used to develop an application of which performance is significant.

The QML application is a Qt based native application and includes basic applications (e.g., card view, home dashboard, virtual keyboard, etc.) provided with webOS platform. Herein, QML is a mark-up language of a script type instead of C++.

Meanwhile, in the above description, the native application means an application that is developed with C/C++, complied, and run in binary form. Such a native application has an advantage of a fast running speed.

Figure 8:
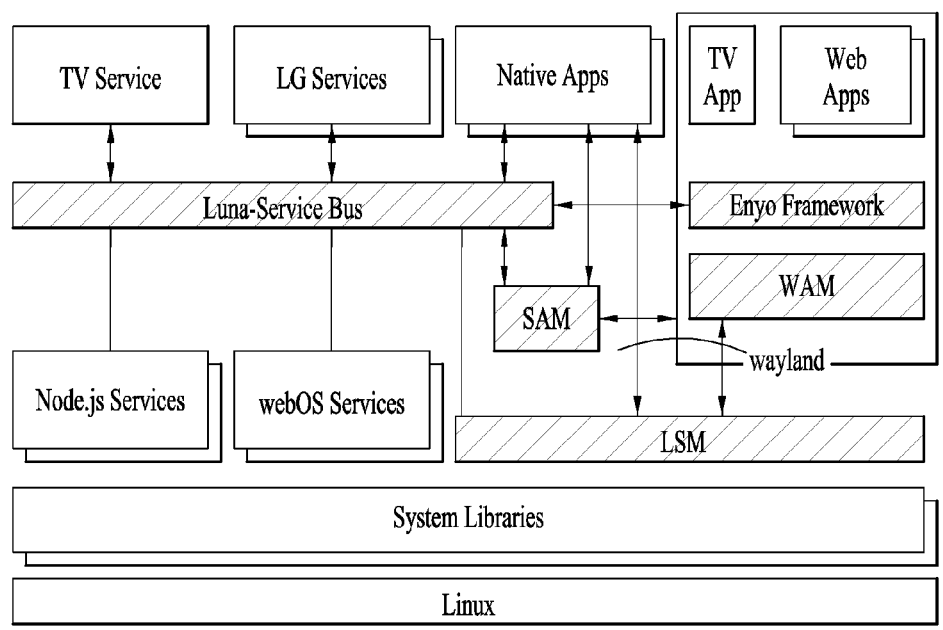
FIG. 8 is a diagram showing architecture of webOS device according to one embodiment of the present invention.

FIG. 8 is a diagram showing an architecture of webOS device according to one embodiment of the present invention.

FIG. 8 is a block diagram based on a runtime of a webOS device, which can be understood with reference to the layered structure shown in FIG. 7.

The following description is made with reference to FIG. 7 and FIG. 8.

Referring to FIG. 8, above a system OS (Linux) and system libraries, services, applications and webOS core modules are included. And, communications among them can be performed through Luna-Service-Bus.

Node.js services (e-mail, contact, calendar, etc.) based on HTML5, CSS, and java script, webOS services such as Logging, backup, file notify, database (DB), activity manager, system policy, AudioD (Audio Daemon), update, media server and the like, TV services such as EPG (Electronic Program Guide), PVR (Personal Video Recorder), data broadcasting and the like, CP services such as voice recognition, Now on, Notification, search, ACR (Auto Content Recognition), CBOX (Contents List Browser), wfdd, DMR, Remote Application, download, SDPIF (Sony Philips Digital Interface Format) and the like, native applications such as PDK applications, browser, QML application and the like, and Enyo Framework based UI related TV applications and Web applications are processed through the webOS core module like the aforementioned SAM, WAM and LSM via Luna-Service-Bus. Meanwhile, in the above description, it is not mandatory for the TV applications and the Web applications to be Enyo-Framework-based or UI-related.

CBOX can manage a list and metadata for contents of such an external device connected to TV as USB, DLNA, Cloud and the like. Meanwhile, the CBOX can output a content listing of various content containers such as USB, DMS, DVR, Cloud and the like in form of an integrated view. And, the CBOX shows a content listing of various types such as picture, music, video and the like and is able to manage the corresponding metadata. Besides, the CBOX can output a content of an attached storage by real time. For instance, if a storage device such as USB is plugged in, the CBOX should be able to output a content list of the corresponding storage device. In doing so, a standardized method for the content list processing may be defined. And, the CBOX may accommodate various connecting protocols.

SAM is provided to enhance improvement and extensibility of module complexity. Namely, for instance, since an existing system manager handles various functions (e.g., system UI, window management, web application run time, constraint condition processing on UX, etc.) by a single process, implementation complexity is very high. Hence, by separating major functions and clarifying an inter-function interface, implementation complexity can be lowered.

LSM supports system UX implementation (e.g., card view, launcher, etc.) to be independently developed and integrated and also supports the system UX implementation to easily cope with a product requirement change and the like. In case of synthesizing a plurality of application screens like App On App, the LSM enables multitasking by utilizing hardware (HW) resource to the maximum, and is able to provide a window management mechanism for multi-window, 21:9 and the like.

LSM supports implementation of system UI based on QML and enhances development productivity thereof. QML UX can easily configure a screen layout and a UI component view and facilitates development of a code for processing a user input. Meanwhile, an interface between QML and WebOS component is achieved through QML extensive plug-in, and a graphic operation of application may be based on wayland protocol, luna-service call and the like.

LSM is an abbreviation of Luna Surface Manager, as described above, and performs a function of an application window compositor.

LSM synthesizes an independently developed application, a US component and the like and then outputs the synthesized one to a screen. With respect to this, if components such as Recents application, showcase application, launcher application and the like render contents of their own, respectively, LSM defines an output region, an inter-operating method and the like as a compositor. So to speak, the LSM (i.e., compositor) processes graphic synthesis, focus management, input event and the like. In doing so, LSM receives an event, a focus and the like from an input manager. Such an input manager may include a remote controller, an HID (e.g., mouse & keyboard), a joy stick, a game pad, an application remote, a pen touch and the like.

Thus, LSM supports a multiple window model and can be simultaneously run on all applications owing to system UI features. With respect to this, LSM can support launcher, recents, setting, notification, system keyboard, volume UI, search, finger gesture, Voice Recognition (STT (Sound to Text), TTS (Text to Sound), NLP (Natural Language Processing), etc.), pattern gesture (camera, MRCU (Mobile Radio Control Unit)), Live menu, ACR (Auto Content Recognition), and the like.

Figure 9:
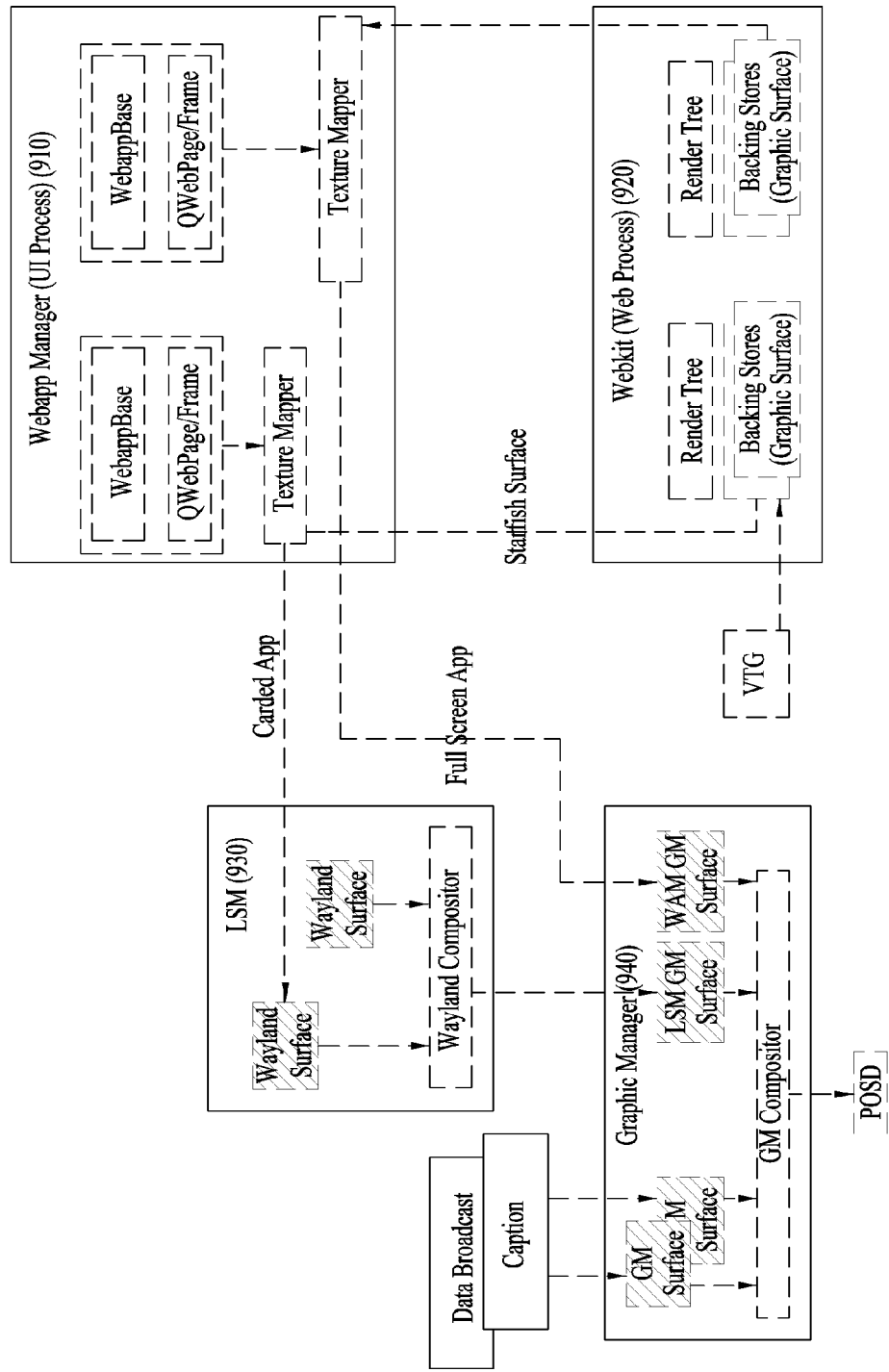
FIG. 9 is a diagram showing a graphic composition flow in a webOS device according to one embodiment of the present invention.

FIG. 9 is a diagram showing a graphic composition flow in a webOS device according to one embodiment of the present invention.

Referring to FIG. 9, a graphic composition processing can be performed through a web application manager 910 in charge of a UI process, a webkit 920 in charge of a web process, an LSM 930, and a graphic manager (GM) 940.

If a web application based graphic data (or application) is generated as a UI process from the web application manager 910, the generated graphic data is forwarded to a full-screen application or the LSM 930. Meanwhile, the web application manager 910 receives an application generated from the webkit 920 for sharing the GPU (graphic processing unit) memory for the graphic managing between the UI process and the web process and then forwards it to the LSM 930 if the application is not the full-screen application. If the application is the full-screen application, it can bypass the LSM 930. In this case, it may be directly forwarded to the graphic manager 940.

The LSM 930 sends the received UI application to a wayland compositor via a wayland surface. The wayland compositor appropriately processes it and then forwards it to the graphic manager. Thus, the graphic data forwarded by the LSM 930 is forwarded to the graphic manager compositor via the LSM GM surface of the graphic manager 940 for example.

Meanwhile, as described above, the full-screen application is directly forwarded to the graphic manager 940 without passing through the LSM 930. Such an application is processed by the graphic manager compositor via the WAM GM surface.

The graphic manager processes all graphic data within the webOS device. The graphic manager receives all the graphic data through the GM surface like data broadcasting application, caption application and the like as well as the data through the LSM GM and the data through the WAM GM surface and then processes them to be outputted to the screen appropriately. Herein, a function of the GM compositor is equal or similar to that of the aforementioned compositor.

Figure 10:
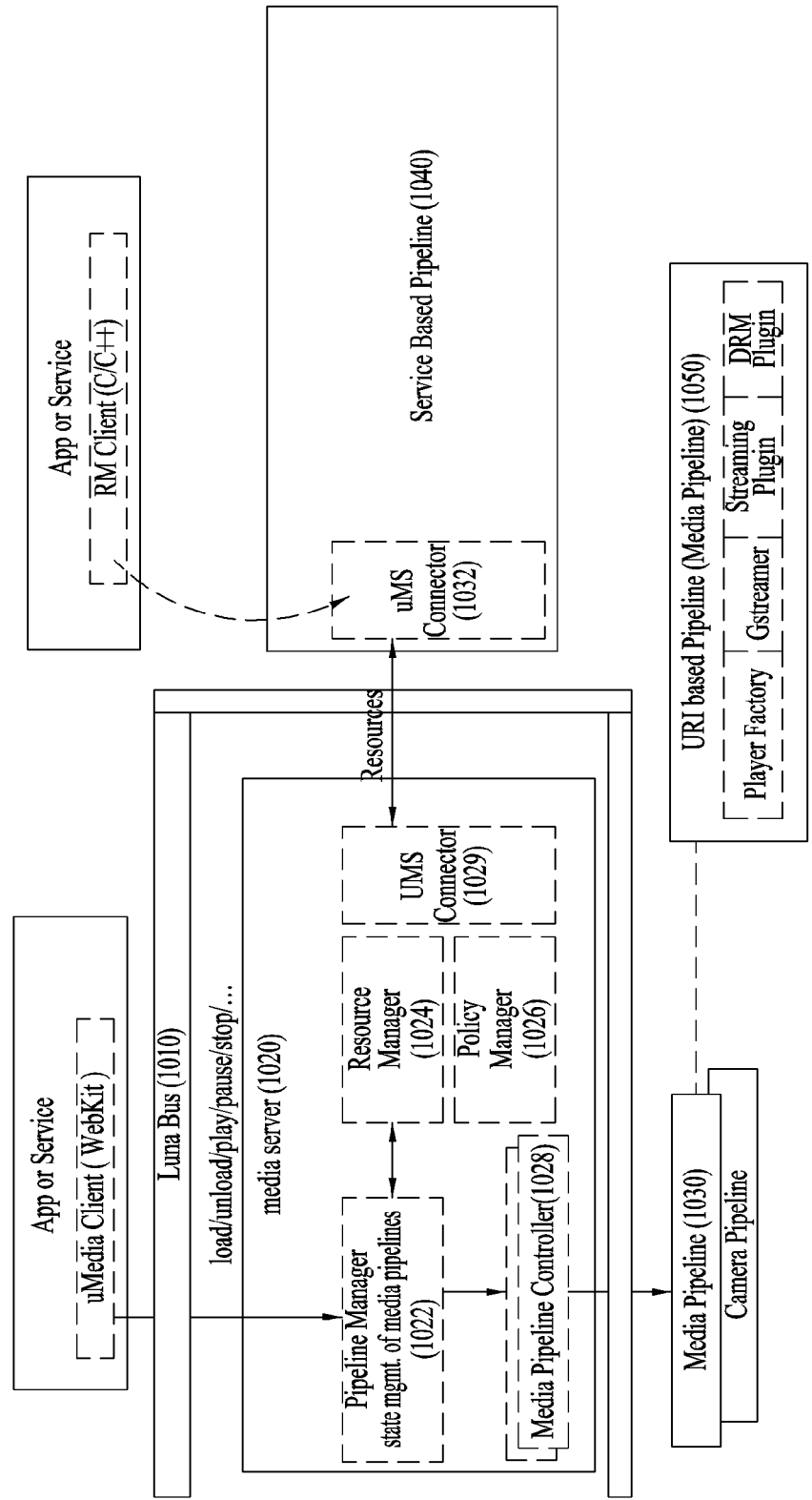
FIG. 10 is a diagram showing a media server according to one embodiment of the present invention.
Figure 11:
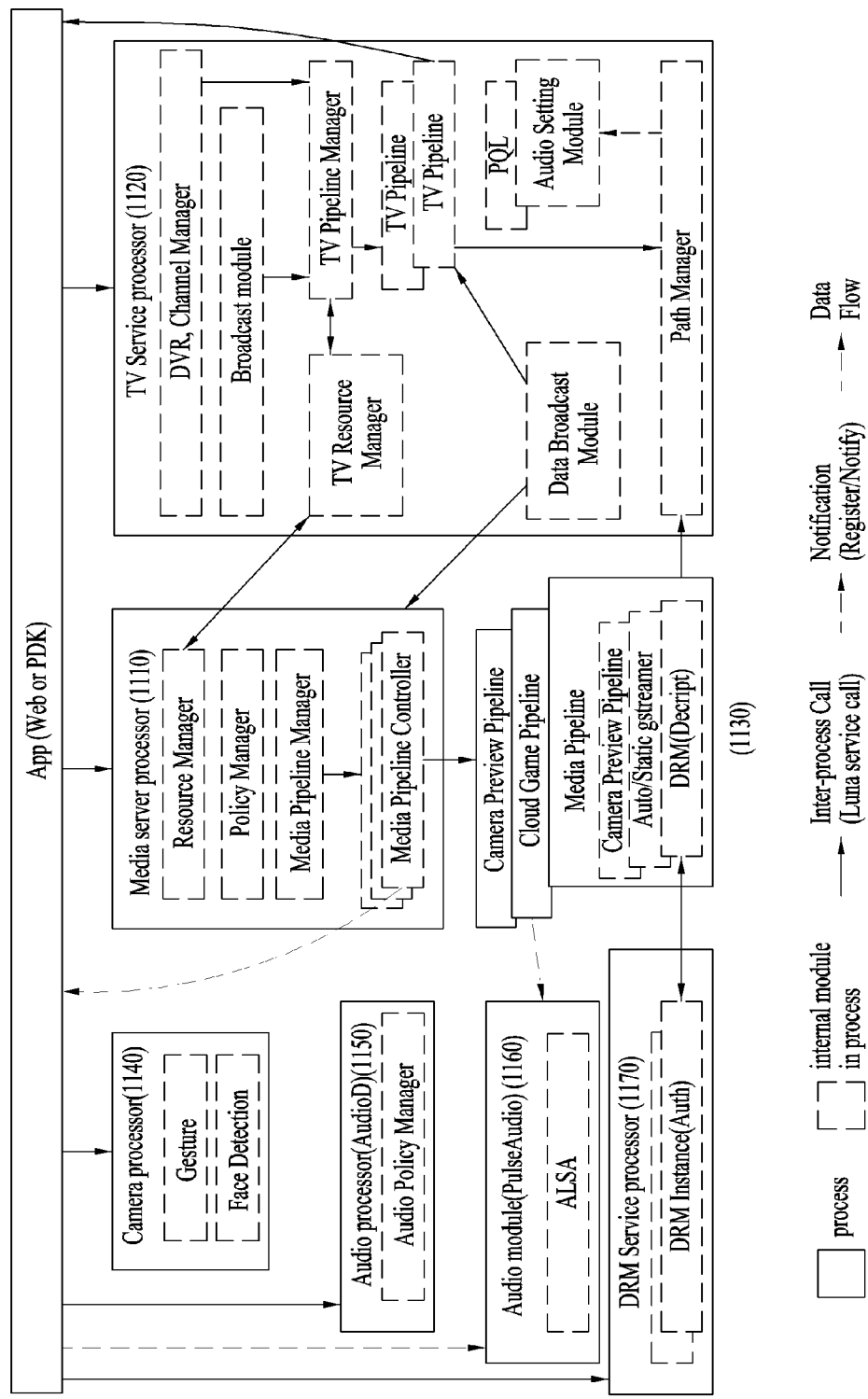
FIG. 11 is a block diagram showing a configuration of a media server according to one embodiment of the present invention.
Figure 12:
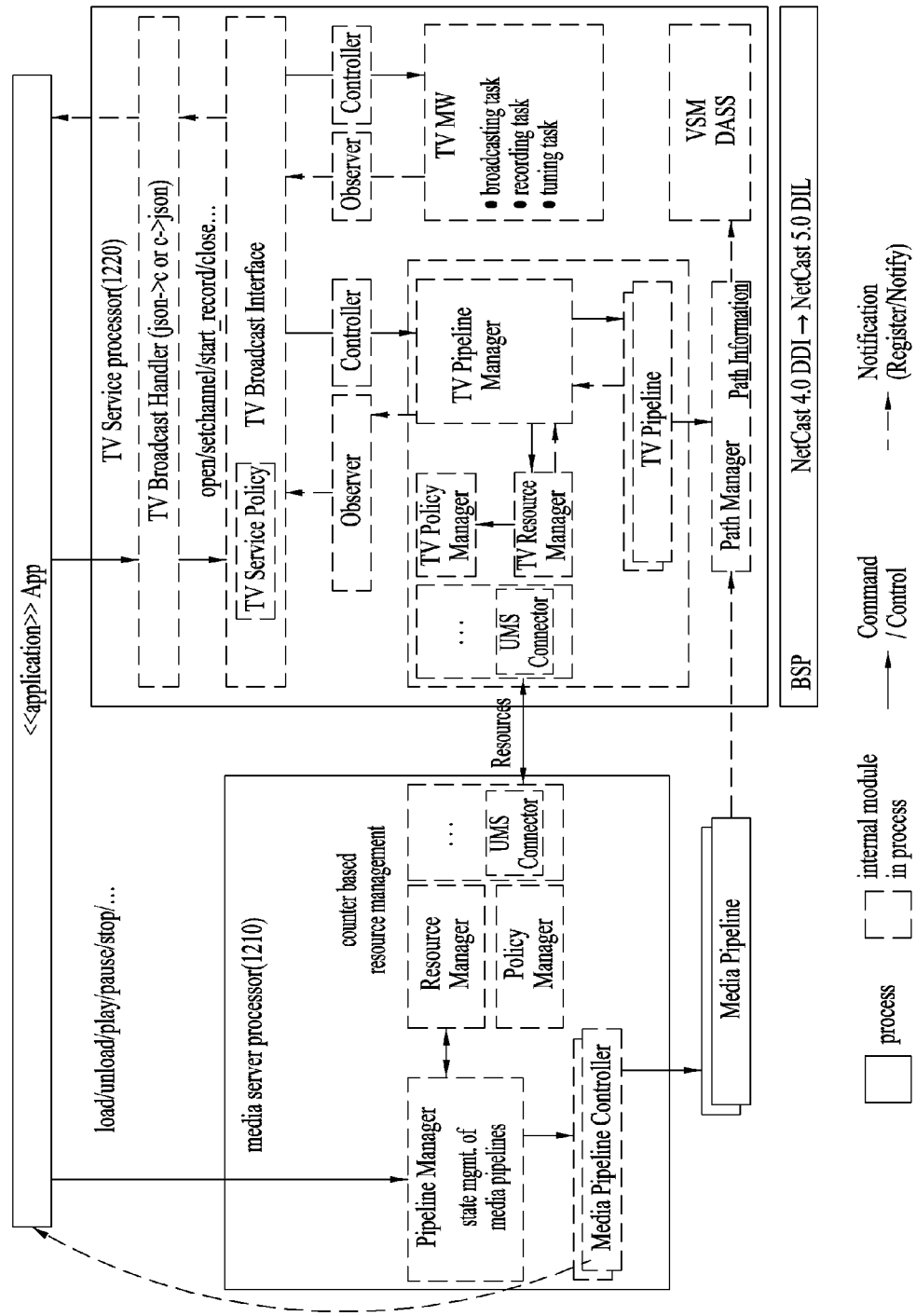
FIG. 12 is a diagram showing the relation between a media server according to one embodiment of the present invention and a TV service.

FIG. 10 is a diagram showing a media server according to one embodiment of the present invention. FIG. 11 is a block diagram showing a configuration of a media server according to one embodiment of the present invention. FIG. 12 is a diagram showing the relation between a media server and according to one embodiment of the present invention and a TV service.

A media server supports executions of various multimedia in a digital device and manages necessary resources. The media server can efficiently use a hardware resource required for a media play. For instance, the media server needs audio/video hardware resource to execute multimedia, and is able to efficiently utilize the resource by managing a current resource use status. Generally, a stationary (or standing) device having a screen larger than that of a mobile device requires more hardware resources on multimedia execution and needs a faster encoding/decoding and graphic data transfer speed due to a massive data size. Meanwhile, the media server should be able to handle a broadcasting/recording/tuning task, a task of recording at the same time of viewing, a task of displaying both a sender screen and a receiver screen during a video call, and the like as well as a streaming and a file based play. Yet, since hardware resources such as an encoder, a decoder, a tuner, a display engine, and the like are limited by chipset units, it is difficult for the media server to execute several tasks at the same time. Hence, the media server handles the tasks in a manner of restricting a use scenario or receiving an input of user selection.

The media server can add robustness to system stability. For instance, by removing an erroneous play pipeline per pipeline in the course of a media play and then re-maneuvering the media play, another media play is not affected even if such an error occurs. Such a pipeline is a chain of connecting the respective unit functions (e.g., decoding, analysis, output, etc.) in case of a media play request, and necessary unit functions may be changed according to a media type and the like.

The media server may have extensibility. For instance, the media server can add a pipeline of a new type without affecting an existing implementation scheme. For instance, the media server can accommodate a camera pipeline, a video conference (Skype) pipeline, a third-party pipeline and the like.

The media server can handle a general media play and a TV task execution as separate services, respectively. The reason for this is that an interface of a TV service is different from a media play case. In the above description, the media server supports operations of 'setchannel', 'channelup', 'channeldown', 'channeltuning', 'recordstart' and the like in association with the TV service but supports operations of 'play', 'pause', 'stop' and the like in association with the general media play, thereby supporting different operations for the two services, respectively. Thus, the media server is able to handle the services separately.

The media server may control or manage resource management functions integratedly. Hardware resource allocation, recovery and the like in a device are integratedly performed in the media server. Particularly, a TV service process delivers a currently running task, a current resource allocation status and the like to the media server. Each time each media is executed, the media server secures a resource, activates a pipeline, and performs a grant of execution by a priority (e.g., policy), a resource recovery of other pipelines and the like in response to a media execution request based on a current resource status occupied by each pipeline. Herein, a predefined execution priority and a necessary resource information for a specific request are managed by a policy manager, and a resource manager can handle resource allocation, recovery and the like by communicating with the policy manager.

The media server can retain an ID (identifier) for every operation related to a play. For instance, based on an identifier, the media server can give a command by indicating a specific pipeline. For two or more media plays, the media server may give a command to pipelines by distinguishing the two from each other.

The media server may be in charge of a play of HTMS 5 standard media.

Besides, the media server may follow a TV reconfiguration range for a separate service processing of a TV pipeline. The media server can be designed irrespective of the TV reconfiguration range. If the TV is not separately service-processed, when a problem arises from a specific task, the TV may be re-executed entirely.

The media server is so-called uMS, i.e., a micro media server. Herein, a media player is a media client. This may mean a webkit for HTML 5 video tag, camera, TV, Skype, $2^{nd}$ screen and the like.

A core function of the media server is the management of a micro resource such as a resource manager, a policy manager or the like. With respect to this, the media server controls a playback control role on a web standard media content. Regarding this, the media server may manage a pipeline controller resource.

Such a media server supports extensibility, reliability, efficient resource usage and the like for example.

So to speak, the uMS, i.e., the media server manages and controls the use of resources for an appropriate processing in a webOS device such as a resource (e.g., cloud game, MVPD (pay service, etc.), camera preview, 2nd screen, Skype, etc.), a TV resource and the like overall, thereby functioning in managing and controlling an efficient usage. Meanwhile, when resources are used, each resource uses a pipeline for example. And, the media server can manage and control generation, deletion, usage and the like of the pipeline for resource management overall.

Herein, a pipeline may be generated if a media related to a task starts to continue a job such as a parsing of request, decoding stream, video output, or the like. For instance, in association with a TV service or application, watching, recording, channel tuning or the like is individually processed in a manner that a resource usage or the like is controlled through a pipeline generated in response to a corresponding request.

A processing structure of a media server and the like are described in detail with reference to FIG. 10 as follows.

In FIG. 10, an application or service is connected to a media server 1020 through a luna-service bus 1010. The media server 1020 is connected to generated pipelines through the luna-service bus 1010 again and manages them.

The application or service is provided with various clients according to its property and is able to exchange data with the media server 1020 or the pipelines through them.

The clients may include a uMedia client (webkit) for the connection to the media server 1020, an RM (resource manager) client (C/C++) and the like for example.

The application including the uMedia client, as described above, is connected to the media server 1020. In particular, the uMedia client corresponds to a video object to be described later. Such a client uses the media server 1020 for an operation of a video in response to a request or the like.

Herein, the video operation relates to a video status. Loading, unloading, play (or, playback, reproduce), pause, stop and the like may include all status data related to video operations. Each operation or status of a video can be processed through individual pipeline generation. Hence, the uMedia client sends status data related to the video operation to the pipeline manager 1022 in the media server.

The pipeline manager 1022 obtains information on a current resource of a device through data communication with the resource manager 1024 and makes a request for allocation of a resource corresponding to the status data of the uMedia client. In doing so, the pipeline manager 1022 or the resource manager 1024 controls the resource allocation through the data communication with the policy manager 1026 if necessary in association with the resource allocation and the like. For instance, if a resource to be allocated by the resource manager in response to the request made by the pipeline manager 1022 does not exist or is insufficient, an appropriate resource allocation or the like according to the request can be performed according to priority comparison of the policy manager 1026 and the like.

Meanwhile, the pipeline manager 1022 makes a request for pipeline generation for an operation according to the uMedia client's request for the resource allocated according to the resource allocation of the resource manager 1024 to a media pipeline controller 1028.

The media pipeline controller 1028 generates a necessary pipeline under the control of the pipeline manager 1022. Regarding the generated pipelines, as shown in the drawing, pipelines related to play, pause, stop and the like can be generated as well as a media pipeline and a camera pipeline. Meanwhile, the pipelines may include pipelines for HTML5, Web CP, smartshare play, thumbnail extraction, NDK, cinema, MHEG (Multimedia and Hypermedia Information coding Experts Group) and the like.

Besides, pipelines may include a service based pipeline (self-pipeline) and a URI based pipeline (media pipeline) for example.

Referring to FIG. 10, the application or service including the RM client may not be directly connected to the media server 1020. The reason for this is that the application or service may directly process a media. So to speak, in case that the application or service directly processes media, the media server can be bypassed. Yet, in doing so, since resource management is necessary for the pipeline generation and usage, a uMS connector functions for it. Meanwhile, if a resource management request for the direct media processing of the application or service is received, the uMS connector communicates with the media server 1020 including the resource manager 1024. To this end, the media server 1020 should be provided with a uMS connector as well.

Hence, by receiving the resource management of the resource manager 1024 through the uMS connector, the application or service can cope with the request of the RM client. Such an RM client may process services such as native CP, TV service, $2^{nd}$ screen, flash player, U-tube MSE (media source extensions), cloud game, Skype and the like. In this case, as described above, the resource manager 1024 can manage resource through appropriate data communication with the policy manager 1026 if necessary for the resource management.

Meanwhile, the URI based pipeline is processed through the media server 1020 instead of the case of directly processing media like the RM client. The URI based pipelines may include player factory, Gstreamer, streaming plug-in, DRM (Digital Rights Management) plug-in pipeline and the like.

A method of interfacing between an application and media services is described as follows.

There is an interfacing method using a service on a web application. This may be a Luna Call method using PSB (palm service bridge) or a method using Cordova. This is to extend a display with a video tag. Besides, there may be a method of using HTMS5 standard for video tag or media element.

And, there is a method of interfacing using a service in PDK.

Alternatively, there is a method of using a service in an existing CP. This is usable by extending plug-in of an existing platform on the basis of luna for backward compatibility.

Finally, there is an interfacing method in case of non-webOS. In this case, it is able to interface by directly calling a luna bus.

Seamless change is processed by a separate module (e.g., TVWIN), which is a process for showing a TV on a screen preferentially without webOS and then processing seamlessly before or during webOS booting. Since a booting time of webOS is considerably long, it is used to provide basic functions of a TV service preferentially for a quick response to a user's power-on request. And, the module is a part of a TV service process and supports a seamless change capable of providing fast booting and basic TV functions, a factory mode and the like. And, the module may be in charge of a switching from non-webOS mode to webOS mode.

Referring to FIG. 11, a processing structure of a media server is illustrated.

In FIG. 11, a solid line box may indicate a process handling configuration and a dotted line box may indicate an internal processing module in a process. A solid line arrow may include an inter-process call, i.e., a luna service call and a dotted line arrow may indicate a notification of register/notify or a data flow.

A service, a web application or a PDK application (hereinafter 'application) is connected to various service processing configurations through a luna-service bus. Through it, the application operates or an operation of the application is controlled.

A corresponding data processing path is changed according to a type of an application. For instance, if the application is an image data related to a camera sensor, it is processed by being sent to a camera processor 1130. Herein, the camera processor 1130 includes a gesture module, a face detection module and the like and processes image data of the application received. Herein, in case of data requiring a usage of a pipeline and the like automatically or according to a user's selection, the camera processor 1130 may process the corresponding data by generating the pipeline through a media server processor 1110.

Alternatively, if an application includes audio data, the corresponding audio can be processed through an audio processor (AudioD) 1140 and an audio module (PulseAudio) 1150. For instance, the audio processor 1140 processes audio data received from the application and then sends it to an audio module 1150. In doing so, the audio processor 1140 may determine the processing of the audio data by including an audio policy manager. The processed audio data is processed and handled by the audio module 1150. Meanwhile, the application may notify data related to the audio data processing to the audio module 1160, which may be notified to the audio module 1160 by a related pipeline. The audio module 1150 includes ALSA (Advanced Linux Sound Architecture).

Or, in case that an application includes or processes (hereinafter 'includes') a DRM hooked content, a corresponding content data is sent to a DRM service processor 1160. The DRM service processor 1160 generates the DRM hooked content data by generating a DRM instance. Meanwhile, for the processing of the DRM hooked content data, the DRM service processor 1160 can be connected to a DRM pipeline in a media pipeline through the Luna-service bus.

A processing for a case that an application includes media data or TV service data (e.g., broadcast data) is described as follows.

FIG. 12 is a diagram showing details of the media service processor and the TV service processor in FIG. 11.

The following description is made with reference to FIG. 11 and FIG. 12 both.

First of all, in case that an application includes TV service data, it is processed by the TV service processor 1120/1220.

Herein, the TV service processor 1120 may include at least one of a DVR/channel manager, a broadcast module, a TV pipeline manager, a TV resource manager, a data broadcast module, an audio setting module, a path manager and the like. Alternatively, the TV service processor 1220 in FIG. 12 may include a TV broadcast handler, a TV broadcast interface, a service processing unit, a TV middleware (MW), a path manager, and a BSP (NetCast). Herein, the service processing unit may mean a module including a TV pipeline manager, a TV resource manager, a TV policy manager, a USM connector and the like.

In the present specification, The TV service processor may be implemented into the configuration shown in FIG. 11 or FIG. 12 or a combination of both configurations. some of the illustrated components may be omitted or new components (not shown) may be further added as required.

Based on attribute or type of the TV service data received from the application, the TV service processor 1120/1220 sends DVR or channel associated data to the DVR/channel manager and also sends it to the TV pipeline manager to generate and process a TV pipeline. Meanwhile, if the attribute or type of the TV service data is a broadcast content data, the TV service processor 1120 generates and processes a TV pipeline through the TV pipeline manager to process the corresponding data through the broadcast module.

Or, a json (Javascript standard object notation) file or a file composed with c is processed by the TV broadcast handler, sent to the pipeline manager through the TV broadcast interface, and then processed by generating a TV pipeline. In this case, the TV broadcast interface sends the data or file through the TV broadcast handler to the TV pipeline manager on the basis of the TV service policy so that the data or file can be referred to for the pipeline generation.

Meanwhile, the TV pipeline manager may be controlled by the TV resource manager when generating one or more pipelines in response to a TV pipeline generation request from the Processing module or manager in the TV service. Meanwhile, in order to request a status and allocation of a resource allocated for the TV service in response to a TV pipeline generation request made by the TV pipeline manager, the TV resource manager may be controlled by the TV policy manager and performs data communication with the media server processor 1110/1210 through the uMS connector. The resource manager in the media server processor delivers a status and a presence/non-presence of allocation of a resource for a current TV service in response to a request made by the TV resource manager. For instance, as a result of confirmation of the resource manager within the media server processor 1110/1210, if all resources for the TV service are already allocated, it is able to notify the TV resource manager that all current resources are completely allocated. In doing so, the resource manager in the media server processor may request or assign TV pipeline generation for the requested TV service by removing a prescribed TV pipeline according to a priority or prescribed reference from TV pipelines previously assigned for the TV service, together with the notification. Alternatively, according to a status report of the resource manager in the media server processor 1110/1210, the TV resource manager may control TV pipelines to be appropriately removed, added, or established.

Meanwhile, BSP supports backward compatibility with an existing digital device for example.

The above-generated TV pipelines may operate appropriately in the corresponding processing process under the control of the path manager. The path manager may determine or control a processing path or process of pipelines by considering an operation of a pipeline generated by the media server processor 1110/1210 as well as the TV pipeline in the processing process.

If the application includes media data instead of TV service data, the data is processed by the media server processor 1110/1210. Herein, the media server processor 1110/1210 includes a resource manager, a policy manager, a media pipeline manager, a media pipeline controller and the like. Meanwhile, various pipelines generated under the control of the media pipeline manager and the media pipeline controller may include a camera preview pipeline, a cloud game pipeline, a media pipeline and the like. Streaming protocol, auto/static gstreamer, DRM and the like may be included in the media pipeline, of which processing flow may be determined under the control of the path manager. The former description with reference to FIG. 10 is recited for a detailed processing process in the media server processor 1110/1210, which is not described redundantly herein.

In the present specification, the resource manager in the media server processor 1110/1210 can perform a resource managing with a counter base for example.

Figure 13:
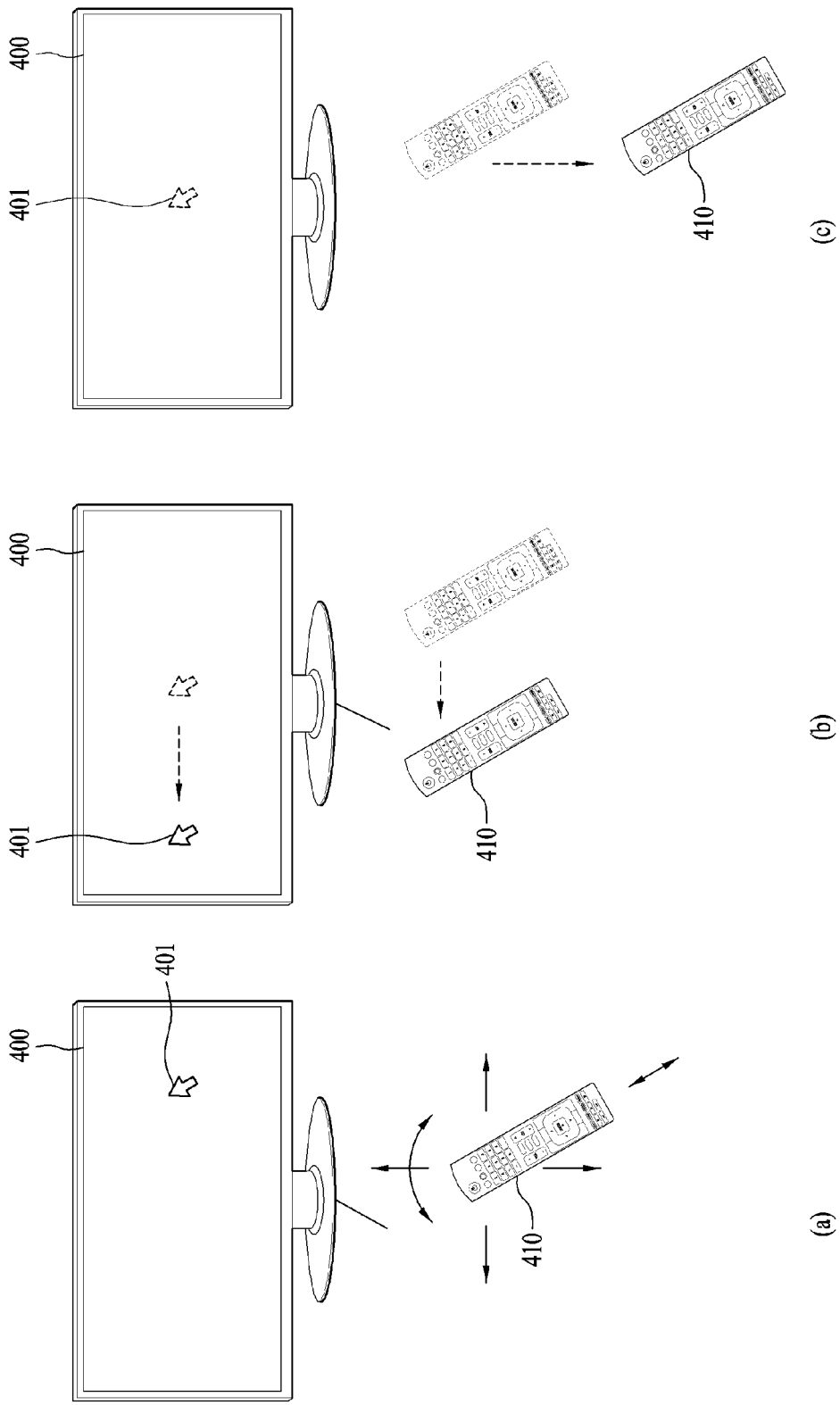
FIG. 13 is a diagram showing a method of controlling a remote controller controlling a random one of video display devices according to embodiments of the present invention.

FIG. 13 is a diagram showing a method of controlling a remote controller controlling a random one of video display devices according to embodiments of the present invention.

As shown in FIG. 13(*a*), a pointer 205 corresponding to a remote controller 200 is displayed on a display unit 180 for example.

A user can move or rotate the remote controller 200 top and bottom, right and left [FIG. 13(*b*)] or back and forth [FIG. 13(*c*)]. The pointer 205 displayed on the display unit 180 of the video display device corresponds to a motion of the remote controller 200. Since the corresponding pointer 205 is moved and displayed in response to a motion in 3D space, such a remote controller 200 may be named a space remote controller.

FIG. 13(*b*) exemplarily shows that, if a user moves the remote controller 200 to the left, the pointer 205 displayed on the display unit 180 of the video display device moves to the left correspondingly.

Information on the motion of the remote controller 200 sensed through a sensor of the remote controller 200 is sent to the video display device. From the information on the motion of the remote controller 200, the video display device may calculate coordinates of the pointer 205. The video display device can display the pointer 205 to correspond to the calculated coordinates.

FIG. 13(*c*) exemplarily shows that a user moves the remote controller 200 to get away from the display unit 180 while pressing a specific button in the remote controller 200. If so, a selected region within the display unit 180 corresponding to the pointer 205 can zoom in so as to be displayed by being enlarged. On the contrary, if a user moves the remote controller 200 to get close to the display unit 180, a selected region within the display unit 180 corresponding to the pointer 205 can zoom out so as to be displayed by being reduced. Meanwhile, if the remote controller 200 gets away from the display unit 180, the selected region may zoom out. If the remote controller 200 gets close to the display unit 180, the selected region may zoom in.

Meanwhile, while the specific button in the remote controller 200 is pressed, recognition of top-bottom and right-left motions may be excluded. Namely, if the remote controller 200 is moved to get away from or close to the display unit 180, top, bottom, right and left motions are not recognized but a back-forth motion can be set to be recognized only. While the specific button in the remote controller 200 is not pressed, only the pointer 205 moves in response to top-bottom or right-left motion of the remote controller 200.

Meanwhile, a moving speed or direction of the pointer 205 may correspond to that of the remote controller 200.

Meanwhile, a pointer in the present specification means an object displayed on the display unit 180 in response to a motion of the remote controller 200. Hence, objects in various shapes are possible using the pointer 205 as well as the arrow shape shown in the drawing. For example, the object may conceptually include one of a point, a cursor, a prompt, a thick outline and the like. And, the pointer 205 can be displayed to correspond to a plurality of points of a line, a surface or the like as well as to correspond to a point of one of a width line and a length line on the display unit 180.

Figure 14:
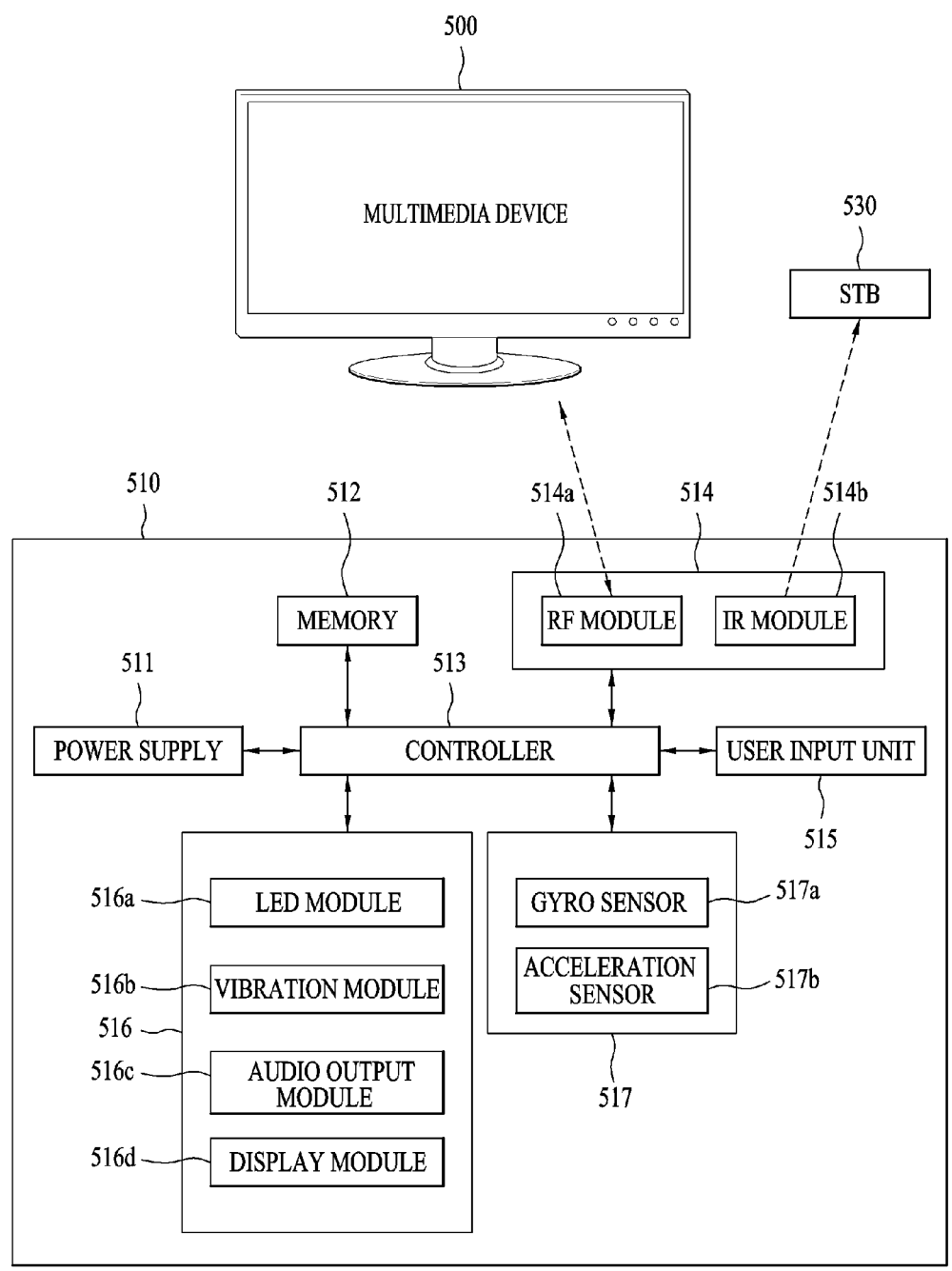
FIG. 14 is an internal block diagram of a remote controller controlling a random one of video display devices according to embodiments of the present invention.

FIG. 14 is an internal block diagram of a remote controller controlling a random one of video display devices according to embodiments of the present invention.

Referring to FIG. 14, a remote controller 200 may include a wireless communication unit 225, a user input unit 235, a sensor unit 240, an output unit 250, a power supply unit 260, a storage unit 270, and a controller 280.

The wireless communication unit 225 transceives signals with a random one of video display devices according to the aforementioned embodiments of the present invention. Among the video display devices according to the embodiments of the present invention, a prescribed video display device 100 shall be described for example.

In the present embodiment, the remote controller 200 may include an RF module 221 capable of transceiving signals with the video display device 100 by the RF communication standards. And, the remote controller 200 may include an IR module 223 capable of transceiving signals with the video display device 100 by the IR communication standards.

In the present embodiment, the remote controller 200 transmits a signal containing information on a motion of the remote controller 200 and the like to the video display device 100 through the RF module 221.

And, the remote controller 200 may receive a signal transmitted by the video display device 100 through the RF module 221. Moreover, the remote controller 200 can send commands for power ON/OFF, channel switching, volume change and the like to the video display device 100 through the IR module 223 if necessary.

The user input unit 235 may include a keypad, a button, a touchpad, a touchscreen or the like. A user manipulates the user input unit 235, thereby inputting a command related to the video display device 100 to the remote controller 200. In case that the user input unit 235 includes a hard key button, a user can input a command related to the video display device 100 to the remote controller 200 through an action of pushing the hard key button. In case that the user input unit 235 includes a touchscreen, a user touches a soft key of the touchscreen, thereby inputting a command related to the video display device 100 to the remote controller 200. The user input unit 235 may include input means (e.g., a scroll key, a jog key, etc.) of various types that can be manipulated by a user, by which the scope of the appended claims and their equivalents is non-limited.

The sensor unit 240 may include a gyro sensor 241 or an acceleration sensor 243.

The gyro sensor 241 can sense information on a motion of the remote controller 200.

For example, the gyro sensor 241 can sense information on an operation of the remote controller 200 with reference to x-, y- and z-axes. The acceleration sensor 243 can sense information on a moving speed of the remote controller 200 and the like. Meanwhile, a distance measurement sensor may be further included, by which a distance from the display unit 180 can be sensed.

The output unit 250 can output a video or audio signal corresponding to a manipulation of the user input unit 235 or a signal transmitted by the video display device 100. Through the output unit 250, a user can whether the user input unit 235 is manipulated, or whether the video display device 100 is controlled.

For example, the output unit 250 may include an LED module 251 configured to turn on light, a vibration module 253 configured to generate vibration, an audio output module 255 configured to output audio, or a display module 257 configured to output video, if the user input unit 235 is manipulated or a signal is transceived with the video display device 100 through the wireless communication unit 225.

The power supply unit 260 supplies power to the remote controller 200. If the remote controller 200 fails to move during a prescribed time, the power supply unit 260 stops supplying the power, thereby reducing the waste of power consumption. If a prescribed key provided to the remote controller 200 is manipulated, the power supply unit 260 can resume the power supply.

The storage unit 270 can store various kinds of programs, applications, data and the like necessary for the control or operation of the remote controller 200. If the remote controller 200 transceives signals with the video display device 100 through the RF module 221 by wireless, the remote controller 200 and the video display device 100 transceive signals on a prescribed frequency band. The controller 280 of the remote controller 200 saves information on a frequency band capable of transceiving signals with the video display device 100 paired with the remote controller 200 by wireless to the storage unit 270 and is then able to refer to the saved information.

The controller 280 controls various matters or issues related to the control of the remote controller 200. The controller 280 can transmit a signal corresponding to a manipulation of a prescribed key of the user input unit 235 or a signal corresponding to a motion of the remote controller 200 sensed by the sensor unit 240 to the video display device 100 through the wireless communication unit 225.

Figure 15:
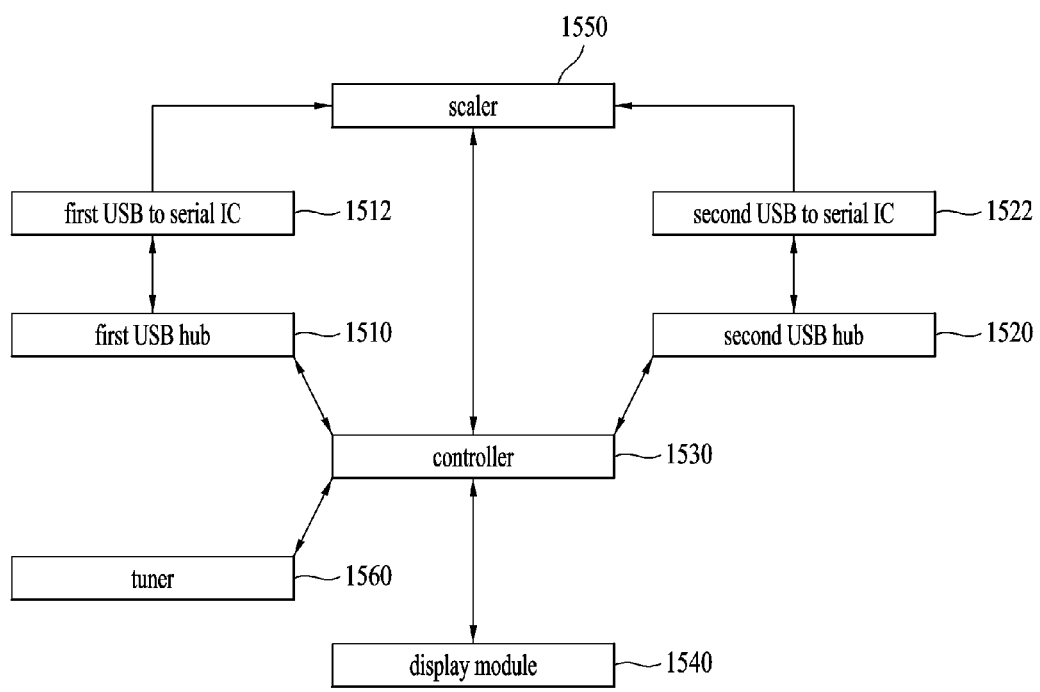
FIG. 15 is a diagram of configuration of a display device according to one embodiment of the present invention.

FIG. 15 is a diagram of configuration of a display device according to one embodiment of the present invention.

Referring to FIG. 15, a display device 1500 may include a first USB hub 1510, a first USB to serial IC 1512, a second USB hub 1520, a second USB to serial IC 1522, a controller 1530, a display module 1540, a scaler 1550, and a tuner 1560. Here, a first device may include a Windows OS installed computer and a second device may include a Mac OS installed computer.

The first USB hub 1510 receives an input signal from the first device.

The second USB hub 1520 receives an input signal from the second device.

A first element 1512 is connected to the first USB hub 1510 and recognizes the first device. Here, the first element 1512 may include the first USB to serial IC.

A second element 1522 is connected to the second USB hub and recognizes the second device. Here, the second element 1522 may include the second USB to serial IC.

If the first USB hub 1510 and the second SUB hub 1520 recognize the first device and the second device, respectively, the controller 1530 communication-connects the first and second USB hubs and receives a control command for controlling a pointer from a specific device corresponding to one of the first and second devices. While a screen is partitioned into a first region and a second region, if the pointer displayed on the specific region corresponding to one of the first and second regions reaches a region change sensing region of partitioning the screen into the first region and the second region, the controller 1530 receives a control command for controlling the pointer from a device different from the specific device.

If the pointer reaches the region change sensing region, the controller 1530 receives a control command for USB hub switching from the specific device corresponding to one of the first device and the second device and then switches a specific USB hub corresponding to one of the first USB hub and the second USB hub to the other in response to the received control command.

This shall be described in detail later with reference to FIG. 18.

The controller 1530 specifies a specific file in the specific region corresponding to one of the first region and the second region. if receiving an input of moving the specific file from the specific region to the other from the specific device corresponding to the specific region, the controller 1530 moves the specific file from the specific region to a region different from the specific region by USB serial communication.

For example, the controller 1530 specifies an audio file in the first region. if receiving an input for moving the audio file from the first region to the second region from the first device corresponding to the first region, the controller 1530 moves the audio file from the first region to the second region by USB serial communication in response to the received input.

When a PBP mode is enabled, if the first element connected to the first USB hub 1510 recognizes the first device and the second element connected to the second USB hub 1520 recognizes the second device, the controller 1530 communication-connects the first element and the second element.

Here, a PBP (picture by picture) screen means a partitioned screen. And, the partitioned screen includes the first region and the second region.

Particularly, if the PBP mode is enabled, a screen output of the first device is displayed on the first region of the display device and a screen output of the second device is displayed on the second region of the display device.

In a state that the PMB mode is enabled, the controller 1530 synchronizes a communication connection input signal from the first device and the first USB hub 1510, synchronizes a communication connection input signal from the second device and the second USB hub 1520, and obtains which USB hub is used in response to which communication connection input signal.

The controller 1530 specifies the specific file in the first region that displays a content of the first device, receives an input of moving the specific file from the first region to the second region displaying a content of the second device using a pointer, and moves the specific file from the first region to the second region in response to the received input.

The controller 1530 executes a control command indicating which one of the first region and the second region is activated.

For example, a light-emitting module (not shown) indicating an activated state of the first region or the second region can be attached to the display module itself. The light-emitting module may include a first light-emitting module installed at the bottom of the first region and a second light-emitting module installed at the bottom of the second region.

If the first region is activated, the controller activates the first light-emitting module but deactivates the second light-emitting module. Moreover, if the second region is activated, the controller 1530 activates the second light-emitting module but deactivates the first light-emitting module.

Therefore, according to the present invention, a user can be intuitively aware that a region connected to a specific device is activated by viewing a light-emitting module, whereby user convenience is improved.

If moving the specific file from the first region to the second region, the controller 1530 launches an application related to the specific file.

For example, when the specific file is an image file, if the specific file is moved from the first region to the second region, the controller 1530 launches an image editor application.

For example, when the specific file is a media file such as a music file, a video file or the like, if the specific file is moved from the first region to the second region, the controller 1530 launches a media player application.

For example, when the specific file is a text file, if the specific file is moved from the first region to the second region, the controller 1530 launches a text editor application.

Therefore, according to the present invention, if a specific file is moved from a first region to a second region, as an application related to the specific file is launched, since a user does not make a separate action for launching an application, user convenience is improved.

The controller 1530 sets a pointer shape in the first region to be different from a pointer shape in the second region.

For example, the controller 1530 sets a pointer shape in the first region to 'A' and also sets a pointer shape in the second region to 'B'.

Therefore, according to the present invention, since a pointer shape in a first region is different from a pointer shape in a second region, a user can be intuitively aware that a display device is currently linked to which device, thereby improving user convenience.

A communication between the controller 1530 and another component of the display device uses DDC/CI (display data channel command interface) communication. In this case, product implementation can be further simplified advantageously.

When the controller 1530 communicates with the first device and the second device, it is able to use extended display identification data (hereinafter abbreviated EDID).

EDID is a sort of data structure and contains various informations on a display device such as a monitor. EDID contains information on a manufacturer name, a product type, an EDID version, a fluorescent substance or filter type, a timing, a screen size, a luminance, a pixel, etc.

For example, if a display device is connected to a device such as a computer, EDID of the display device is sent to the connected computer. The computer is then able to obtain what kind of a display device is connected based on the received EDID.

Hence, the first device obtains the display device property based on the EDID received from the controller and is able to send a control signal for the display device to execute a screen optimized for its current state to the controller.

The display module 1540 displays at least one of a pointer, a text and a graphic image on the screen in response to the control command.

Here, the first region displays the screen output of the first device, and the second region displays the screen output of the second device.

The scaler 1550 disassembles data in a specific one of the first element and the second element into packets, delivers the packets to the other element, and reconstructs the data by assembling the packets in the other element.

The controller 1530 communication-connects the first element 1512 and the second element 1522 through the scaler 1550.

For example, the scaler 1550 disassembles data into packets in the first element 1512, delivers the packets to the second element 1522 from the first element 1512, and reconstructs data by assembling the packets in the second element 1522.

The tuner 1560 receives a broadcast signal from an external server.

According to one embodiment of the present invention, a process for performing data communication in a state that a display device, a first device and a second device are connected through USB cable is described as follows.

The first USB to serial IC 1512 and the second USB to serial IC 1522, which are built in the display device, play roles as data deliverers. The first and second USB to serial ICs 1512 and 1522 enable the display device 1500 to play a role as a special USB cable. Particularly, the first device and the second device operate as hosts.

Once communication-connected, the first device and the second device transceive data with each other via the display device. Namely, data is transmitted in order of first device-→first USB hub→first USB to serial IC→scaler→second USB to serial IC→second USB hub→second device. Here, the first device becomes a source device and the second device becomes a destination device.

Particularly, in case of sending data from the source device to the destination device, the first device records a first USB to serial IC data according to a predefined protocol. If the data received from the first device is the data that should be sent to the second device, the scaler records the received data in a buffer of the second USB to serial IC connected to the second device.

The second data receives data from the second USB to serial IC, whereby data transmission is possible between the first and second devices as a result.

The present invention is mainly described about the PBP mode, which is one embodiment only. And, the present invention is identically executable in PIP (picture in picture) mode as well.

And, the present invention relates to a display device and can be extended to apply to a monitor having a PBP mode and a smart TV having a PBP function.

Figure 16:
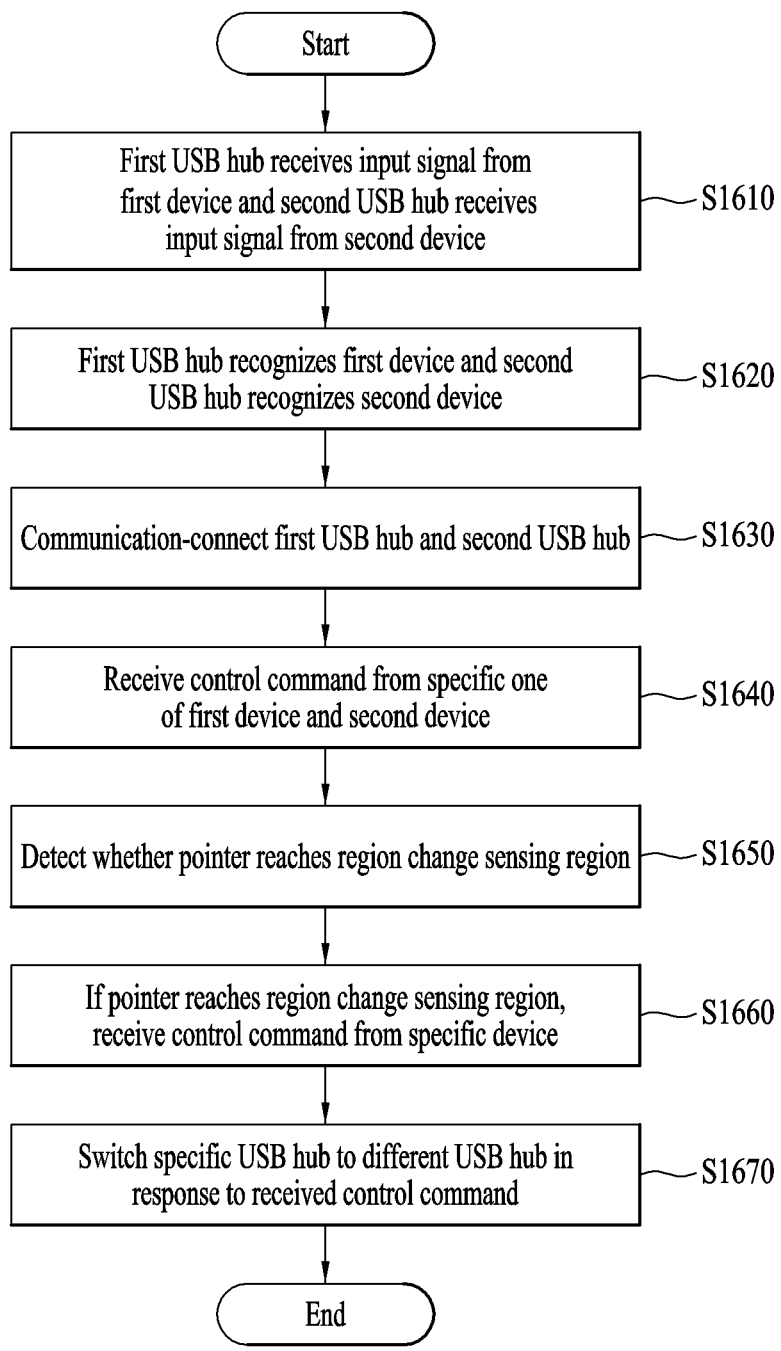
FIG. 16 is a flowchart of a display device controlling method according to one embodiment of the present invention.

FIG. 16 is a flowchart of a display device controlling method according to one embodiment of the present invention. The present invention is performed by the controller 1530.

Referring to FIG. 16, the first USB hub receives an input signal from the first device and the second USB hub receives an input signal from the second device [S1610].

Regarding the controller 1530, the first USB hub recognizes the first device and the second USB hub recognizes the second device [S1620].

The controller 1530 communication-connects the first element and the second element [S1630].

Particularly, the scaler 1550 disassembles data into packets in the first element, delivers the packets to the second element from the first element, reconstructs data by assembling the packets in the second element, and communication-connects the first element and the second element based on the reconstructed data.

The controller 1530 receives a control command from a specific device that is one of the first and second devices [S1640].

The controller 1530 detects whether the pointer reaches a region change sensing region where the first region changes into the second region [S1650].

Once the pointer reaches the region change sensing region, the controller 1530 receives a control command from the specific device [S1660].

In response to the received control command, the controller 1530 switches a specific USB hub to a USB hub different from the specific USB hub [S1670].

According to another embodiment of the present invention, if the pointer passes through a boundary region of a screen in the first region and then moves into the second region, the controller 1530 moves data from the first region to the second region.

Particularly, the controller 1530 specifies a specific file in the first region displaying a screen output of the first device, receives an input of moving the specified specific file from the first region to the second region using the pointer, and then moves the specified file from the first region to the second region in response to the received input. Here, the file is an embodiment and the same method is applicable to a case of data, text, or graphic image.

According to user settings or if a file contains a preset specific attribute, the controller 1530 may restrict the file from being moved from the first region to the second region.

For example, if a user does not want a sharing with other users, although an input for moving a file from the first region to the second region is received, the controller 1530 does not move the file according to user settings.

For example, if the file is a security file, it may contain an identifier indicating that it is a security file. If the file contains the identifier indicating the security file, the controller 1530 does not move the file despite receiving an input for moving the file from the first region to the second region.

According to the present invention, if a user does not want to share a file with another sharer or a file is a security file, it is able to restrict the file from being moved from the first region to the second region. Therefore, user convenience can be improved.

According to another embodiment of the present invention, in a PBP mode enabled state, the controller 1530 can automatically synchronize a USB hub with an input signal from each device.

Particularly, in a PBP mode enabled state, the controller 1530 synchronizes a communication connection input signal from the first device with the first USB hub, synchronizes a communication connection input signal from the second device with the second USB hub, and obtains which USB hub is used to correspond to which communication connection input signal.

Figure 17:
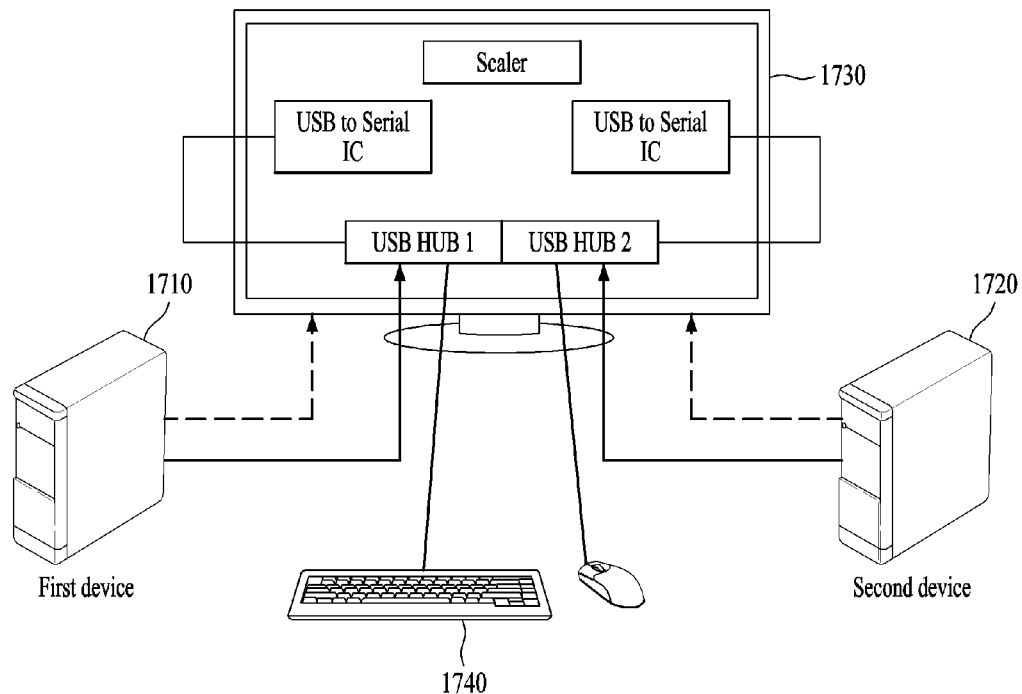
FIG. 17 is a diagram showing that data is transmitted on a PBP screen according to one embodiment of the present invention when a single mouse and keyboard are shared between devices having heterogeneous OSs respectively installed thereon.

FIG. 17 is a diagram showing that data is transmitted on a PBP screen according to one embodiment of the present invention when a single mouse and keyboard are shared between devices having heterogeneous OSs respectively installed thereon.

Referring to FIG. 17, a display device 1730 includes a first USB hub and a second USB hub. A first USB to serial IC capable of USB to serial communication is connected to the first USB hub. A second USB to serial IC capable of USB to serial communication is connected to the second USB hub. And, a scaler of the display device can communicate with the first device and the second device through the first USB to serial IC and the second USB to serial IC, respectively.

Here, the first device 1710 may include a Windows OS installed PC and the second device 1720 may include a MAC OS installed PC.

In a PBP mode enabled state, the controller 1530 can automatically synchronize an input signal in the first USB hub and an input signal in the second USB hub.

In the PBP mode enabled state, the controller 1530 can transmit data and files to the second device 1720 from the first device 1710 or transmit data and files from the second device 1720 to the first device 1710.

Particularly, in a PBP mode enabled sate, a process for automatically synchronizing each input signal in each of the first and second USB hubs is described as follows.

When the PBP mode is enabled, the controller 1530 synchronizes an input signal of the first USB hub and an input signal of the second USB hub according to an input combination of a currently configured PBP mode.

If the first device and the first USB hub are connected, the controller 1530 controls the first element connected to the first USB hub to be recognized as a COM port by the first device.

The controller 1530 controls the first device to perform USB to serial communication with the display device using the recognized COM port. Moreover, the controller 1530 controls the first device to perform DDCCI communication through an input cable connected to the display device.

In the enabled PBP mode, through the USB communication and the DDCCI communication, the controller 1530 synchronizes the input signal of the first device and the first USB hub and also synchronizes the input signal of the second device and the second USB hub.

According to the present invention, a user can obtain which USB hub is currently used for an input from which device.

If a pointer reaches a boundary region between a first region and a second region of a PBP screen, the according to the present invention automatically detects a keyboard and mouse and switches to the second region from the first region.

Particularly, when the pointer reaches the boundary region of the screen, the controller 1530 delivers a USB hub switching command to the first USB hub and switches the first USB hub to the second USB hub.

Hence, a user can control the second device 1720 using the keyboard and mouse 1740 connected to the display device.

The controller 1530 changes a synchronization target into the second device from the first device.

The controller 1530 can control an input device (e.g., keyboard, mouse, etc.) connected to the display device to operate in the second device connected to a right part of a screen of the PBP mode. And, the controller 1530 can control an input device (e.g., keyboard, mouse, etc.) connected to the display device to operate in the first device connected to a left part of the screen of the PBP mode.

Figure 18:
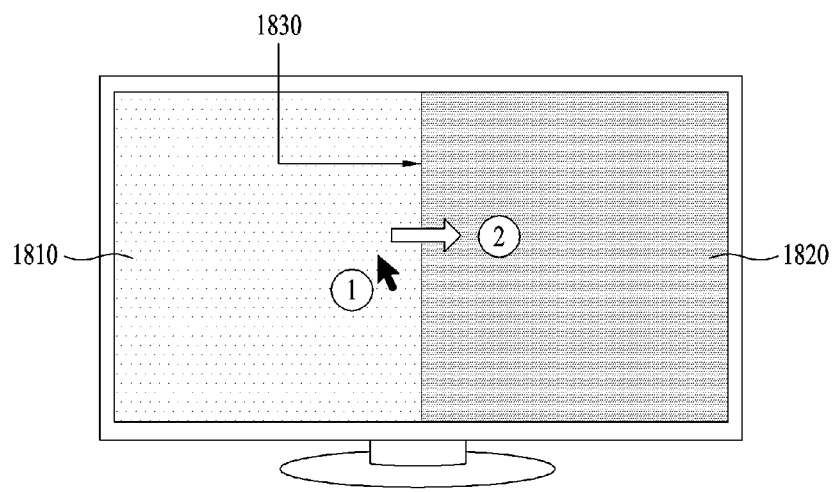
FIG. 18 is a diagram showing that a specific USB hub according to one embodiment of the present invention is switched to a USB hub different from the specific USB hub.

FIG. 18 is a diagram showing that a specific USB hub according to one embodiment of the present invention is switched to a USB hub different from the specific USB hub.

Referring to FIG. 18, if a pointer reaches a region change sensing region, the controller 1530 receives a control command for switching a USB hub from a specific device that is one of the first device and the second device and then switches a specific USB hub, which is one of the first USB hub and the second USB hub, to a USB hub different from the specific USB hub in response to the received control command.

For example, if the pointer reaches a boundary region 1830 between a first region 1810 and a second region 1820, the controller 1530 receives a control command for a USB hub switching from the first device and then switches the first USB hub to the second USB hub in response to the received control command.

According to the present invention, if the pointer is located in the first region 1810, the controller 1530 receives a control signal from the first device. If the pointer is located in the second region 1820, the controller 1530 receives a control signal from the second device.

Figure 19:
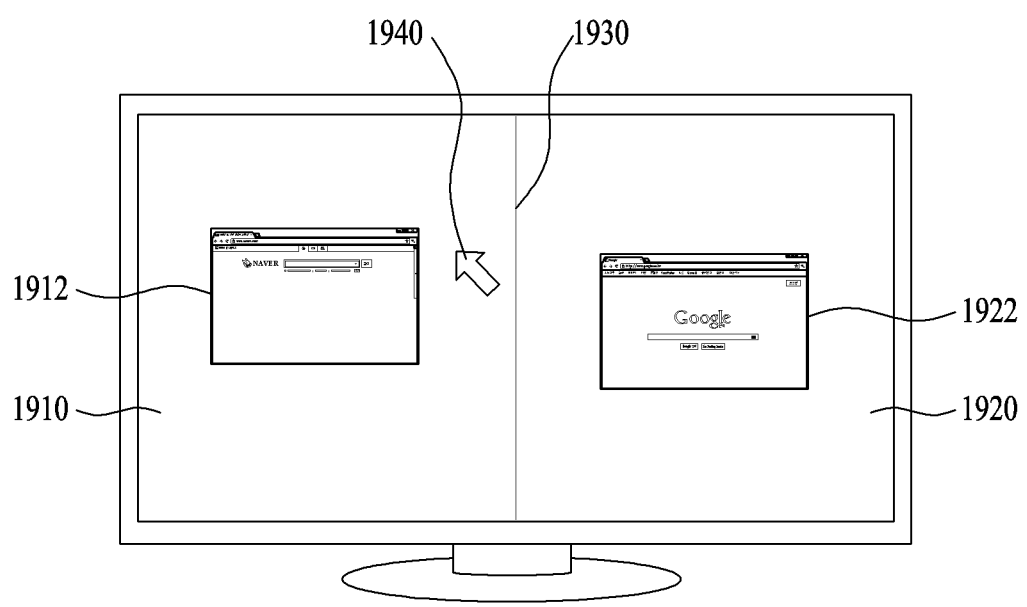
FIG. 19 is a diagram showing that text input windows are launched between heterogeneous OS installed devices on a PBP screen device according to one embodiment of the present invention and that a single mouse and keyboard are shared between the devices.

FIG. 19 is a diagram showing that text input windows are launched between heterogeneous OS installed devices on a PBP screen device according to one embodiment of the present invention and that a single mouse and keyboard are shared between the devices.

Referring to FIG. 19, in a display device in a PBP mode enabled state, a first OS such as Mac OS is running on a first region 1910 and a second OS such as Windows OS is running on a second region 1920.

The controller 1530 launches a text input window 1912 on the first region 1910. If a pointer 1940 reaches a boundary region 1930 from the first region 1910, the controller 1530 changes an active region into the second region 1920 from the first region 1910.

After changing the active region, the controller 1530 can receive a text input from a user through a second text input window 1922.

Figure 20:
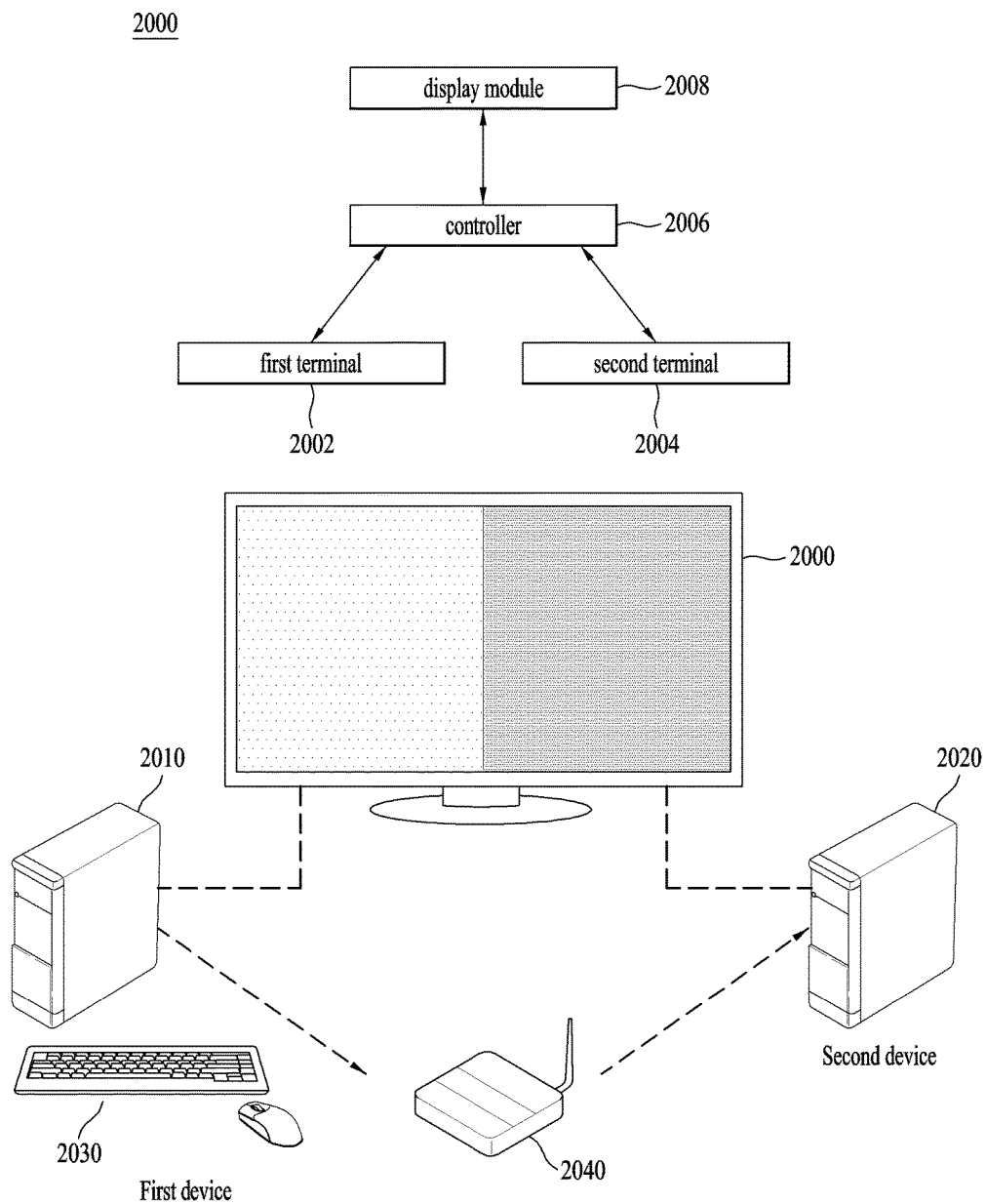
FIG. 20 is a diagram showing a diagram of configuration of a display device according to one embodiment of the present invention and also showing that heterogeneous OS installed devices are connected through a network and share a single keyboard and mouse.

FIG. 20 is a diagram showing a diagram of configuration of a display device according to one embodiment of the present invention and also showing that heterogeneous OS installed devices are connected through a network and share a single keyboard and mouse.

Referring to FIG. 20, a display device 2000 includes a first terminal 2002, a second terminal 2004, a controller 2006 and a display module 2008.

The first terminal 2002 receives an input signal from a first device 2010.

The second terminal 2004 receives an input signal from a second device 2020.

If the first device 2010 and the second device 2020 are connected by wired or wireless network and the first terminal and the second terminal recognize the first device and the second device, respectively, the controller 2006 receives a control command for controlling the pointer from a specific device that is one of the first device and the second device. In a state that a screen is partitioned into a first region and a second region, if the pointer displayed on a specific region corresponding to one of the first region and the second region reaches a region change sensing region for partitioning the screen into the first region and the second region, the controller 2006 receives a control command for controlling the pointer from a device different from the specific device through a network.

The display module 2008 displays at least one of a pointer, a text and a graphic image on the screen according to a control command from the controller 2006.

Here, the first region displays a screen output of the first device 2010 and the second region displays a screen output of the second device 2020.

The controller 2006 specifies a specific file in a specific region that is one of the first region and the second region. If receiving an input for moving the specific file from the specific region to a region different from the specific region using the pointer from a specific device corresponding to the specific region, the controller 2006 moves the specific file from the specific region to the region different from the specific region by a network communication in response to the received input.

For example, the controller 2006 specifies a video file in the first region. If receiving an input for moving the video file from the first region to the second region using the pointer, the controller 2006 moves the video file from the first region to the second region by the network communication in response to the received input.

Particularly, when a file is sent from the first region to the second region, there are preconditions are follows.

According to a precondition 1), a file can be transferred bi-directionally. According to a precondition 2), a computer sending a file becomes a source computer and a computer receiving the file becomes a destination computer.

When a first device like a main computer and a second device like a sub-computer are connected via network, if a specific event occurs, data (e.g., folder, file, text) stored in a clipboard of the main computer can be sent to the destination computer by network communication.

The controller 2006 executes a control command indicating which one of the first region and the second region is activated. This is already described in detail with reference to FIG. 15 and its details shall be omitted.

If the controller 2006 moves the specific file from the specific region that is one of the first region and the second region to the region different from the specific region, the controller 2006 launches an application related to the specific file. This is already described in detail with reference to FIG. 15 and its details shall be omitted.

The controller 2006 differentiates a pointer shape in the first region from that in the second region. This is already described in detail with reference to FIG. 15 and its details shall be omitted.

The first device 2010 is a Windows OS installed PC and operates as a main PC. A keyboard and mouse intended to be shared with the second device 202 is connected to the first device 2010. The second device 2020 is a Mac OS installed PC and operates as a sub-PC.

The display device 2030 is connected to the first device 2010 and the second device 2020. The first device 2010 and the second device 2020 are connected using one of a wired network and a wireless network 2040.

According to another embodiment of the present invention, a keyboard and mouse are shared between devices including at least two computers connected to the same network and a file can be transferred between the devices.

First of all, specific software related to a display device is installed on a first device and a second device such as computers [S2010]. Here, the specific software may be contained in a CD or downloaded from a specific company server.

The first device and the second device including computers are connected to a network [S2020]. Here, the network includes at least one of a wired network and a wireless network.

Subsequently, the first device and the second device are connected to the display device [S2030].

Each of the first and second devices receives an input for launching the specific software from a user [S2040]. For example, if receiving an input of clicking an icon on a tray at a bottom right part of a screen of the display device from the user and an input of clicking the specific software, each of the first and second devices launches the specific software.

The controller checks whether the first device and the second device are network-connected [S2040]. Particularly, the controller periodically checks whether the first and second devices intending to share a keyboard and mouse are connected the same network via a router.

If receiving a main computer mode input from the user, the first device launches the specific software in main computer mode [S2050]. Here, the first device is the first or second device to which the keyboard and mouse to be shared are connected. Moreover, the first device may become a main computer and the second device may become a sub-computer.

If receiving a sub-computer mode input from the user, the second device launches the specific software in sub-computer mode [S2060].

If the first device receives a specific software apply input from the user, the sub-computer is automatically searched for on a main computer mode screen in the display device. And, the specific software apply input of the main computer mode screen is received from the user.

If the first device moves the mouse of the main computer screen to the sub-computer, the keyboard and mouse connected to the first device can be automatically controlled by the sub-computer.

The location settings of the sub-computer and the main computer can be set to 'Left/Right' at a computer designated location of a specific software option setting menu. Moreover, when the specific software is launched, if Internet is connected, the specific software can be automatically updated with a latest version in the first or second device.

Figure 21:
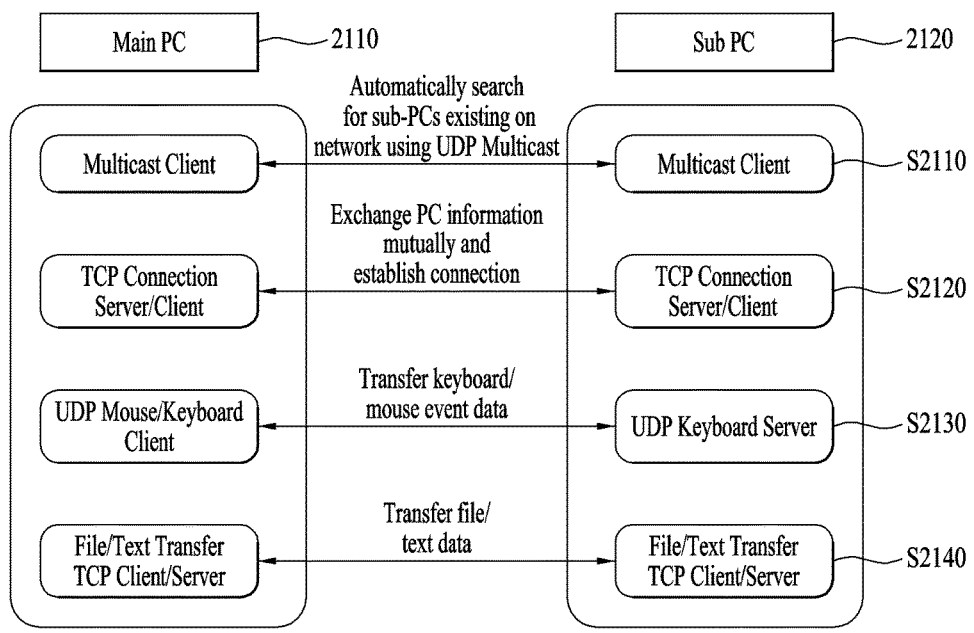
FIG. 21 is a diagram showing a process for heterogeneous OS installed devices to be connected to each other through a network and share a single keyboard and mouse according to one embodiment of the present invention.

FIG. 21 is a diagram showing a process for heterogeneous OS installed devices to be connected to each other through a network and share a single keyboard and mouse according to one embodiment of the present invention.

A main PC 2110 automatically searches for at least one sub-PC 2120 existing on a network through UDP multicast [S2110]. Here, the UDP (user datagram protocol) multicast means that a message or information is simultaneously sent to several targeted computers through a single transmission using a communication protocol that provides a limited service only when messages are exchanged between computers within a network that uses an IP.

The main PC establishes a communication connection to the sub-PC 2120 through TCP and transceives information necessary for the communication connection [S2120]. Hence, the main PC and the sub-PC are connected through the network.

After completion of the connection establishment, an input of moving a pointer from the main PC 2110 to the sub-PC 2120 is received from a user. If the pointer reaches a boundary region, the main PC 2110 executes a control command for switching the pointer from the main PC 2110 to the sub-PC 2120. Namely, the main PC 2110 delivers keyboard and mouse event data to the sub-PC 2120 using UDP [S2130].

The main PC 2110 transceives files and data with the sub-PC 2120 through TCP [S2140].

Therefore, according to the present invention, through TCP, files and texts can be bi-directionally transceived between the main PC 2110 and the sub-PC 2120.

Figure 22:
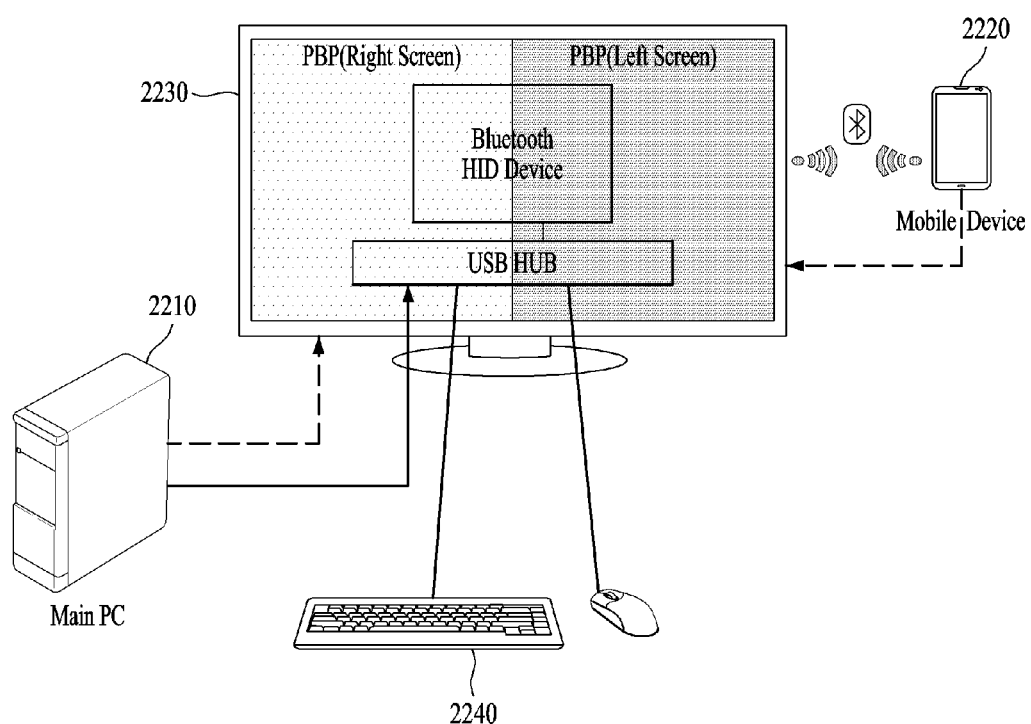
FIG. 22 is a diagram showing a process for heterogeneous OS installed devices to be connected to each other through Bluetooth and share a single keyboard and mouse according to one embodiment of the present invention.

FIG. 22 is a diagram showing a process for heterogeneous OS installed devices to be connected to each other through Bluetooth and share a single keyboard and mouse according to one embodiment of the present invention.

A display device 2330 is connected to a main PC 2210, a mobile device 2220, a keyboard and mouse 2240. Particularly the display device 2230 is connected to the mobile device 2220 by Bluetooth communication.

If a PBP mode is enabled, a controller 1530 of the display device 2230 controls a screen output of the main PC 2210 to be displayed on a left screen and also controls a screen output of the mobile device to be displayed on a right screen.

If the main PC and the display device are connected together via USB upstream cable, a Bluetooth module of the display device is recognized by the main PC.

The Bluetooth module is paired with the mobile device, and the mobile device recognizes the keyboard and mouse connected to the display device by Bluetooth communication.

The main PC delivers a keyboard and mouse event having occurred in the main PC to the mobile device through the Bluetooth module and transceives data, files and texts with the mobile device.

A process for heterogeneous OS installed devices to share a single keyboard and mouse is described in detail as follows.

The controller 1530 detects that a pointer is moved to a boundary region.

The controller 1530 converts the keyboard and mouse event occurring in the main PC into HID data and sends the converted data to the mobile device.

If an input of pressing the keyboard or moving the mouse is received from the main PC, the mobile device displays a screen of moving the keyboard or mouse like the main PC. For example, if an OS of the mobile device is Androids, the controller 1530 can control the keyboard and mouse. If an OS of the mobile device is iOS, the controller 1530 can control the keyboard only.

If receiving an input of using the keyboard and mouse from the mobile device, the controller 1530 launches a function of hiding a mouse cursor from a first region that displays a screen output of the main PC.

If the pointer is moved to a boundary region from a second region that displays a screen output of the mobile device, the controller 1530 executes a command for controlling the keyboard and mouse in the main PC.

If receiving an input of moving data from the first region to the second region from a user through the pointer, the controller 1530 executes a command for transferring data, file and text of the main PC to a Bluetooth device.

Figure 23:
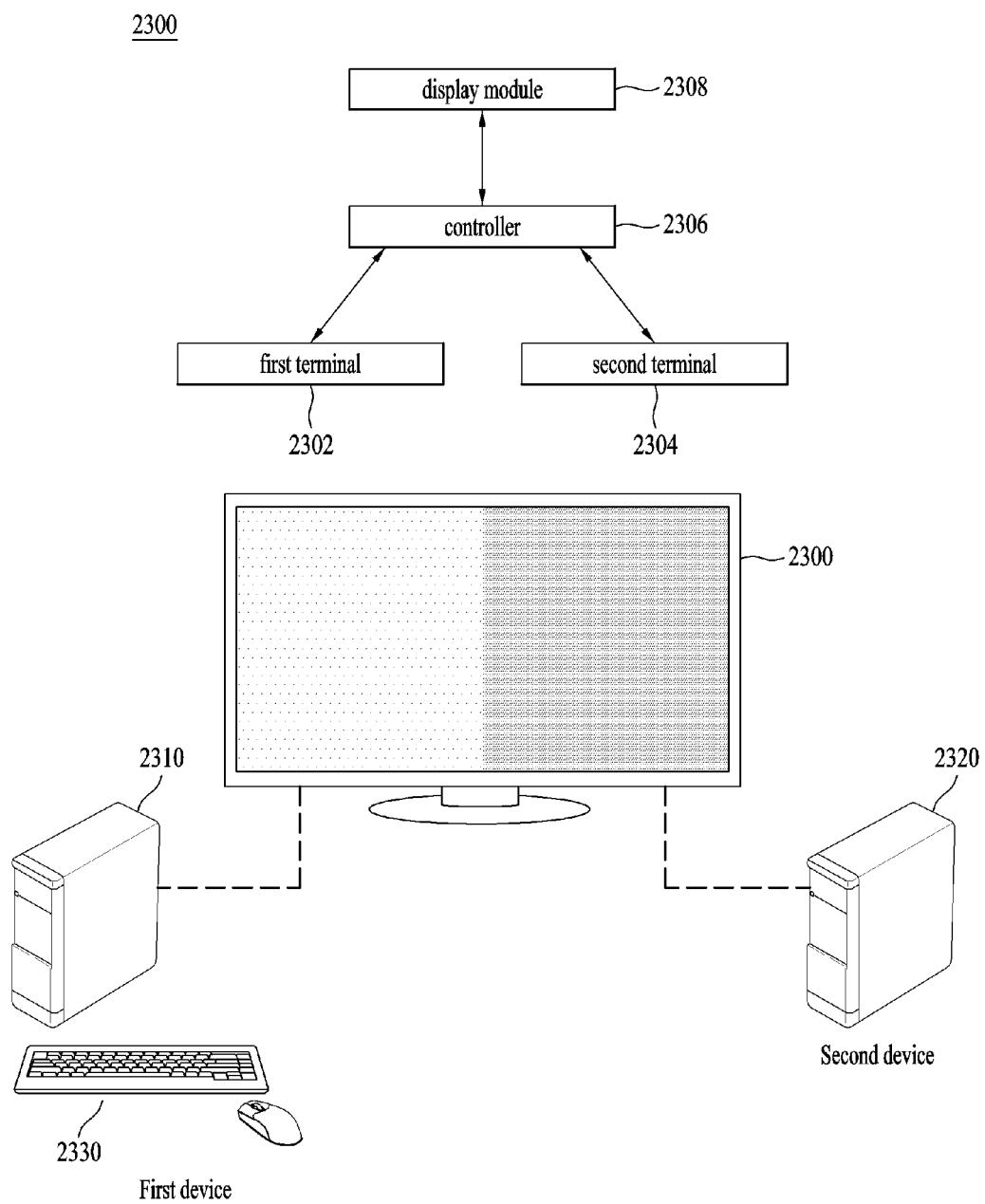
FIG. 23 is a diagram showing a diagram of configuration of a display device according to one embodiment of the present invention and also showing that heterogeneous OS installed devices are connected through API communication and share a single keyboard and mouse.

FIG. 23 is a diagram showing a diagram of configuration of a display device according to one embodiment of the present invention and also showing that heterogeneous OS installed devices are connected through API communication and share a single keyboard and mouse.

Referring to FIG. 23, a display device 2300 includes a first terminal 2302, a second terminal 2304, a controller 2306 and a display module 2308.

The first terminal 2302 receives an input signal from a first device 2310.

The second terminal 2304 receives an input signal from a second device 2320.

If the first terminal and the second terminal recognize the first device 2310 and the second device 2320, respectively, the controller 2306 connects the first terminal and the second terminal by API communication and receives a control command for controlling the pointer from a specific device that is one of the first device and the second device. In a state that a screen is partitioned into a first region and a second region, if the pointer displayed on a specific region corresponding to one of the first region and the second region reaches a region change sensing region for partitioning the screen into the first region and the second region, the controller 2306 receives a control command for controlling the pointer from a device different from the specific device.

The display module 2308 displays at least one of a pointer, a text and a graphic image on the screen according to a control command from the controller 2306.

Here, the first region displays a screen output of the first device 2310 and the second region displays a screen output of the second device 2320.

An input device 2330 includes a keyboard and mouse. The input device 2330 may be connected to the first device 2310 and the display device 2300.

The controller 2306 specifies a specific file in a specific region that is one of the first region and the second region. If receiving an input for moving the specific file from the specific region to a region different from the specific region using the pointer from a specific device corresponding to the specific region, the controller 2306 transfers the specific file from the specific region to the region different from the specific region by API communication in response to the received input.

API (application programming interface) means an interface provided to control a function provided by an operating system or a programming language to be used on an application program. The API mainly provides an interface for file control, window control, image processing, text control, etc.

For example, if the pointer is moved from the first region to the second region, a content is disassembled into packets in the first region, the separated packets are transferred from the first region to the second region by API communication, and the transferred packets are assembled in the second region so as to reconstruct the content.

According to the present invention, although the first device and the second device are not connected via network, as data can be transferred from the first region to the second region by API communication, user convenience can be improved.

The controller 2306 executes a control command indicating which one of the first region and the second region is activated. This is already described in detail with reference to FIG. 15 and its details shall be omitted.

If the controller 2306 moves the specific file from the specific region that is one of the first region and the second region to the region different from the specific region, the controller 2306 launches an application related to the specific file. This is already described in detail with reference to FIG. 15 and its details shall be omitted.

The controller 2306 differentiates a pointer shape in the first region from that in the second region. This is already described in detail with reference to FIG. 15 and its details shall be omitted.

Figure 24:
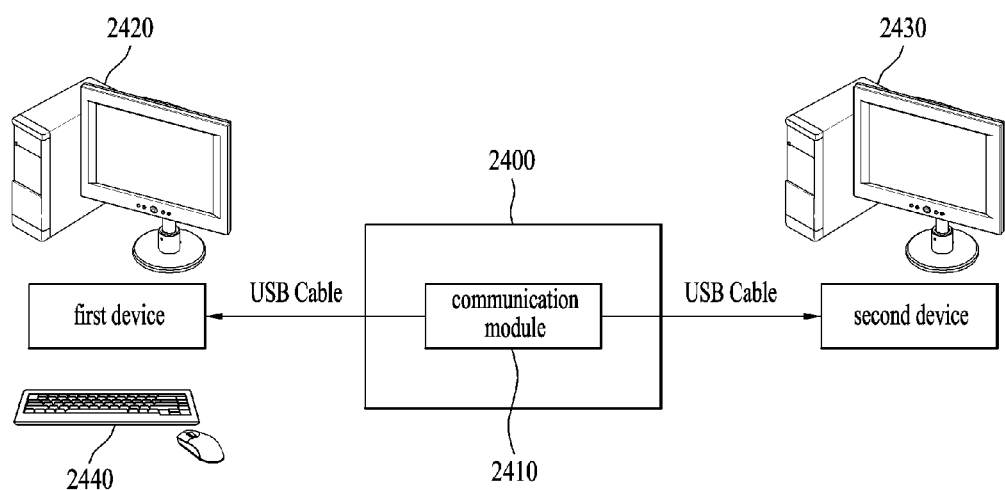
FIG. 24 is a diagram showing that a display device according to one embodiment of the present invention and heterogeneous OS installed devices are connected through a specific communication module Bluetooth and share a single keyboard and mouse.

FIG. 24 is a diagram showing that a display device according to one embodiment of the present invention and heterogeneous OS installed devices are connected through a specific communication module Bluetooth and share a single keyboard and mouse.

Referring to FIG. 24, a display device 2400 includes a communication module 2410. The display device is connected to a first device 2420 and a second device 2430 via USB cables, and the first device and the second device are connected through the communication module 2410. The first device 2420 is connected to an input device 2440 including a keyboard and mouse.

USB is basically a host to device (or, master to slave) I/O Bus protocol. In case of USB communication, one side is a host and the other side should be a device.

Even if both of the connected terminals are hosts, the USB communication module 2410 controls communication to be enabled.

Particularly, even if the first and second devices 2420 and 2430 are hosts, the USB communication module 2410 controls data to be transceived between the first and second devices 2420 and 2430.

According to the present invention, communication can be performed between the first and second devices 2420 and 2430 that are the hosts. If a pointer reaches a region change sensing region, a control command for changing a control region is received from the first device 2420 and a control command is received from the second device 2430 in response to the received control command for changing the control region.

According to one embodiment of the present invention, data can be transceived between a first device and a second device having heterogeneous OSs respectively installed thereon in a manner that a first USB hub receives an input signal from a first device, that a second USB hub receives an input signal from a second device, that a first element connected to the first USB hub recognizes the first device, that a second element connected to the second USB hub recognizes the second device, and that the first device and the second device are communication-connected to each other, whereby user convenience can be improved.

According to another embodiment of the present invention, a user can move a specific file from a first region to a second region having an installed OS different from that of the first region using a pointer, thereby improving user convenience.

According to another embodiment of the present invention, a single keyboard mouse can be shared among devices having different OSs respectively installed thereon using a USB hub switching, thereby improving user convenience.

According to another embodiment of the present invention, an application related to a specific file can be launched if the specific file is moved from a first region to a second region, thereby improving user convenience.

According to further embodiment of the present invention, data transmission can be performed through a display device despite that a plurality of devices are not network-connected by wire or wireless, thereby improving user convenience.

The video display device and operating method thereof according to the present invention can be achieved by combination of structural elements and features of the present invention. Each of the structural elements or features should be considered selectively unless specified separately. Also, some structural elements and/or features may be combined with one another to enable various modifications of the embodiments of the present invention.

The method of operating the video display device according to the present invention can be implemented as processor-readable codes in a recording medium readable by a processor provided to the video display device. The processor-readable media may include all kinds of recording devices in which data readable by a processor are stored. The processor-readable recording media may include ROM, RAM, CD-ROM, magnetic tapes, floppy discs, optical data storage devices, and the like for example and also include carrier-wave type implementations (e.g., transmission via Internet). Further, the recording medium readable by a processor is distributed to a computer system connected to a network, whereby codes readable by the processor by distribution can be saved and executed.

Moreover, although embodiments have been described with reference to a number of illustrative embodiments thereof, it should be understood that numerous other modifications and embodiments can be devised by those skilled in the art that will fall within the spirit and scope of the principles of this disclosure. And, such modifications and variations should not be individually understood from the technical idea or prospect of the present invention.

BEST MODE FOR INVENTION

Various embodiments are described in BEST MODE FOR INVENTION for implementing the present invention.

INDUSTRIAL APPLICABILITY

The present invention is applicable to a series of display device fields.

It will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A display device, comprising:
a first USB hub configured to receive an input signal from a first device;
a second USB hub configured to receive an input signal from a second device;
a controller configured to:
communication-connect the first USB hub and the second USB hub if the first USB hub and the second USB hub recognize the first device and the second device, respectively,
receive a control command for controlling a pointer from a specific device corresponding to one of the first device and the second device, and
receive a control command for controlling the pointer from a device different from the specific device if the pointer displayed on a specific region corresponding to one of a first region and a second region reaches a region change sensing region for partitioning a screen into the first region and the second region in a state that the screen is partitioned into the first region and the second region; and
a display module configured to display at least one of the pointer, a text and a graphic image on the screen in response to the control command from the controller,
wherein the controller is further configured to:
when the pointer reaches the region change sensing region, receive a control command for USB hub switching from the specific device corresponding to the one of the first device and the second device, and
switch a specific USB hub corresponding to one of the first USB hub and the second USB hub to a USB hub different from the specific USB hub in response to the received control command,
wherein the first region displays a screen output of the first device, and
wherein the second region displays a screen output of the second device.

2. The display device of claim 1, further comprising:
a first element connected to the first USB hub, the first element recognizing the first device;
a second element connected to the second USB hub, the second element recognizing the second device; and
a scaler configured to:
disassemble data into packets in a specific element corresponding to one of the first element and the second element,
deliver the disassembled packets from the specific element to an element different from the specific element, and
reconstruct the data in a manner that the packets are assembled in the different element,
wherein the controller is further configured to connect the first element and the second element through the scaler.

3. The display device of claim 1, wherein the controller is further configured to:
specify a specific file in the specific region corresponding to the one of the first region and the second region, and
transfer the specific file from the specific region to a region different from the specific region by USB serial communication in response to the received input if an input for transferring the specific file from the specific region to the region different from the specific region using the pointer is received from the specific device corresponding to the specific region.

4. The display device of claim 1, wherein the controller is further configured to execute a control command indicating that either the first region or the second region is activated.

5. The display device of claim 1, wherein if a specific file is transferred from the specific region corresponding to the one of the first region and the second region to a region different from the specific region, the controller is further configured to launch an application related to the specific file.

6. The display device of claim 1, wherein the controller is further configured to differentiate a pointer shape in the first region from a pointer shape in the second region.

7. A display device, comprising:
a first terminal configured to receive an input signal from a first device;
a second terminal configured to receive an input signal from a second device;
a controller configured to:
receive a control command for controlling a pointer from a specific device corresponding to one of the first device and the second device when the first device and the second device are connected via a network, if the first terminal and the second terminal recognize the first device and the second device, respectively, and
receive a control command for controlling the pointer from a device different from the specific device through the network if the pointer displayed on a specific region corresponding to one of a first region and a second region reaches a region change sensing region for partitioning a screen into the first region and the second region in a state that the screen is partitioned into the first region and the second region; and
a display module configured to display at least one of the pointer, a text and a graphic image on the screen in response to the control command from the controller,
wherein the controller is further configured to:
specify a specific file in the specific region corresponding to the one of the first region and the second region, and
transfer the specific file from the specific region to a region different from the specific region by network communication in response to the received input if an input for transferring the specific file from the specific region to the region different from the specific region using the pointer is received from the specific device corresponding to the specific region,
wherein the first region displays a screen output of the first device, and
wherein the second region displays a screen output of the second device.

8. The display device of claim 7, wherein the controller is further configured to execute a control command indicating that either the first region or the second region is activated.

9. The display device of claim 7, wherein, the controller is further configured to launch an application related to the specific file if a specific file is transferred from the specific region corresponding to the one of the first region and the second region to a region different from the specific region.

10. The display device of claim 7, wherein the controller is further configured to differentiate a pointer shape in the first region from a pointer shape in the second region.

11. A display device, comprising:
a first terminal configured to receive an input signal from a first device;
a second terminal configured to receive an input signal from a second device;
a controller configured to:
connect the first terminal and the second terminal by API communication if the first terminal and the second terminal recognize the first device and the second device, respectively,
receive a control command for controlling a pointer from a specific device corresponding to one of the first device and the second device, and
receive a control command for controlling the pointer from a device different from the specific device through the network if the pointer displayed on a specific region corresponding to one of a first region and a second region reaches a region change sensing region for partitioning a screen into the first region and the second region in a state that the screen is partitioned into the first region and the second region; and
a display module configured to display at least one of the pointer, a text and a graphic image on the screen in response to the control command from the controller,
wherein the controller is further configured to:
specify a specific file in the specific region corresponding to the one of the first region and the second region, and
transfer the specific file from the specific region to a region different from the specific region by the API communication in response to the received input if an input for transferring the specific file from the specific region to the region different from the specific region using the pointer is received from the specific device corresponding to the specific region,
wherein the first region displays a screen output of the first device, and
wherein the second region displays a screen output of the second device.

12. The display device of claim 11, wherein the controller is further configured to execute a control command indicating that which region is between the first region and the second region.

13. The display device of claim 11, wherein if a specific file is transferred from the specific region corresponding to the one of the first region and the second region to a region different from the specific region, the controller is further configured to launch an application related to the specific file.

14. The display device of claim 11, wherein the controller is further configured to differentiate a pointer shape in the first region from a pointer shape in the second region.

* * * * *